(12) United States Patent
Habenschuss et al.

(10) Patent No.: US 11,049,044 B1
(45) Date of Patent: Jun. 29, 2021

(54) VISUAL IMAGE ANNOTATION UTILIZING MACHINE LEARNING FOR IN-TIME FEEDBACK

(71) Applicant: Blackshark.ai GmbH, Graz (AT)

(72) Inventors: Stefan Habenschuss, Graz (AT); Arno Hollosi, Graz (AT); Pavel Kuksa, Graz (AT); Martin Presenhuber, Graz (AT)

(73) Assignee: BLACKSHARK.AI GMBH, Graz (AT)

(*) Notice: Subject to any disclaimer, the term of this patent is extended or adjusted under 35 U.S.C. 154(b) by 0 days.

(21) Appl. No.: 17/127,821

(22) Filed: Dec. 18, 2020

Related U.S. Application Data

(60) Provisional application No. 63/048,837, filed on Jul. 7, 2020.

(51) Int. Cl.
| | | |
|---|---|---|
| *G06N 20/00* | (2019.01) | |
| *G06K 9/62* | (2006.01) | |
| *G06N 3/08* | (2006.01) | |
| *G06N 5/02* | (2006.01) | |
| *G06N 3/02* | (2006.01) | |

(52) U.S. Cl.
CPC ........... *G06N 20/00* (2019.01); *G06K 9/6256* (2013.01); *G06K 9/6259* (2013.01); *G06K 9/6263* (2013.01); *G06N 3/02* (2013.01); *G06N 3/08* (2013.01); *G06N 5/025* (2013.01); *G06K 9/626* (2013.01); *G06K 9/6253* (2013.01); *G06K 9/6254* (2013.01)

(58) Field of Classification Search
CPC ........ G06N 20/00; G06N 20/10; G06N 20/20; G06N 3/02; G06N 3/08; G06N 5/025; G06K 9/6253; G06K 9/6262; G06K 9/6263; G06K 9/6259; G06K 9/626; G06K 9/6254; G06K 9/6256
USPC .......................................................... 706/12
See application file for complete search history.

(56) References Cited

U.S. PATENT DOCUMENTS

| | | | | |
|---|---|---|---|---|
| 2016/0378868 | A1* | 12/2016 | Har-Noy | ............. G06Q 30/018 707/706 |
| 2016/0379388 | A1* | 12/2016 | Rasco | .................... G06N 5/003 715/753 |
| 2020/0380258 | A1* | 12/2020 | Yu | ..................... G06K 9/00718 |

OTHER PUBLICATIONS

Burr Settles (2010): Active Learning Literature Survey.
(Continued)

*Primary Examiner* — Shane D Woolwine
(74) *Attorney, Agent, or Firm* — Beyer Law Group LLP

(57) ABSTRACT

An interactive learning cycle includes an operator, a computer and a pool of images. The operator produces a sparsely-labeled data set. A back-end system produces live feedback: a densely-labeled training set which is displayed on the computer. Immediate feedback is displayed in color on the operator computer in less than about five seconds. A labeling tool displays a user interface and for every labeling project a region is defined that is downloaded as an image data batch. The operator annotates on a per-image basis in the region and uses several UI tools to mark features in the image and group them to a predefined label class. The back-end system includes processes that run in parallel and feed back into each other, each executing a model. A local model is used independently of the global model. The global model accepts sparsely-labeled images from numerous operator computers.

30 Claims, 39 Drawing Sheets
(33 of 39 Drawing Sheet(s) Filed in Color)

INTERACTIVE LEARNING CYCLE

(56) References Cited

OTHER PUBLICATIONS

Calma et al., "From Active Learning to Dedicated Collaborative Interactive Learning," ARCS 2016; 29th International Conference on Architecture of Computing Systems, Nuremberg, Germany, 2016, pp. 1-8.
Dominik Sacha et al. (2017): What you see is what you can change: Human-centered machine learning by interactive visualization, Neurocomputing (268), 164-175.

* cited by examiner

OVERVIEW OF PARALLEL LOCAL MODELS

LIVE LABELING INTERFACE - ZOOM TOOL

LIVE LABELING INTERFACE - LINE TOOL

FIG. 11 LIVE LABELING INTERFACE - START MODEL

LIVE LABELING INTERFACE - MODEL SETTINGS

LIVE LABELING INTERFACE - EXPORT LABELING MASK ated by human annotators. The anno-

VISUAL IMAGE ANNOTATION UTILIZING MACHINE LEARNING FOR IN-TIME FEEDBACK

CROSS-REFERENCE TO RELATED APPLICATIONS

This application claims priority of U.S. provisional patent application No. 63/048,837, filed Jul. 7, 2020, entitled "METHOD FOR VISUAL IMAGE ANNOTATION UTILIZING MACHINE LEARNING FOR IN-TIME FEEDBACK AND MULTIPLICATION," which is hereby incorporated by reference.

FIELD OF THE INVENTION

The present invention relates generally to interactive learning, a sub-field of machine learning. More specifically, the present invention relates to human annotation of images resulting in machine learning and rapid feedback to the human.

BACKGROUND OF THE INVENTION

Contemporary machine learning (ML) methods began to flourish in the 1990s. Modern ML applications require massive amounts of labeled training data to increase their accuracy in their area of application. To this day, labeled training data is predominantly generated by human annotators. For many deep learning projects, labeled training data is hard to obtain, or slow and expensive to create by manual annotation.

As a result, labeling is frequently a bottleneck significantly slowing down development. The human-centered workflow requires many work hours and is therefore cost intensive. Several providers offer outsourcing schemes to accelerate the creation of labeled training data. In principal, a customer sends in examples of the needed training material (e.g., photographic images) that the provider then applies to training materials using human labelers (mostly in low-wage countries). In other words, a customer needs to show a labeling company (provider) which labels are needed on the training materials. For example, if a customer is training a model to recognize license plates on cars it needs to show the labeling company how they need to label the plates. Then, the labeling company can label all the remaining training materials accordingly.

The customer thereby is not in full control of the entire workflow of the labeling process and quality issues may occur. Active learning is a sub-field of Machine Learning and can be generalized as a method to increase the efficiency of data labeling. Active learning systems attempt to overcome the labeling bottleneck by asking queries in the form of unlabeled instances to be labeled by an oracle (e.g., a human annotator).

In this way, the active learner aims to achieve high accuracy, thereby minimizing the cost of obtaining labeled data. Active learning is well-motivated in many modern machine learning problems where data may be abundant, but labels are scarce or expensive to obtain. FIG. 1 illustrates a prior art active learning cycle 10. Active learning approaches are speeding up the creation of labeled training data by using a human annotator 20 to increase the accuracy of a labeled training set. A machine learning model 40 (executing upon the computer) provides the human with selected unlabeled examples 50 (e.g., images on the computer screen) that may enhance the overall precision of the training set. The annotator has the function to create labels (on the computer screen) for unlabeled input data from the pool (and also validate auto-generated labels provided by the ML model) in order to produce fully-labeled images 60, to be fed back into model 40.

Current state-of-the-art services for such visual data annotation follow standard active learning approaches. The general approach for labeling datasets for semantic segmentation is to assign dense labeling in large batches of images. The impact of a labeling batch on the accuracy of the trained model is evaluated at the level of granularity of the entire batch and with a significant delay when the machine learning training process is applied to include the labeled data sets. Typically, human labelers create dozens, hundreds or even thousands of labeled training images which are then shipped to the client for integration and evaluation. Because there is no live feedback to the labeler, the labeler must label all parts of all features. In other words, evaluation of accuracy requires the entire batch to be produced, delivered and processed which may take weeks.

For example, Amazon Web Services (AWS) offer an active learning based service called "SageMaker." This service may be used by a customer to set up their own labeling pipeline or also to outsource the annotation labor to third parties. Human labelers evaluate auto-generated labels and consolidate the label set to increase accuracy.

Similar to FIG. 1, SageMaker provides images to humans who then add labels or evaluate auto-generated labels. Again, there is significant delay in waiting for the entire batch of training data to be applied. Therefore, it is desired to improve the labeling process in order to increase the efficiency (labor and costs) of creating labeled data sets to train ML applications; in particular, time efficiency will be a key area of improvement for future labeling techniques.

SUMMARY OF THE INVENTION

To achieve the foregoing, and in accordance with the purpose of the present invention, a technique is disclosed that provides near instant feedback to a human annotator.

The present invention uses interactive learning to tackle the limitations described above. It is interactive in the sense that there is an information flow not only from humans to the model but also vice-versa in the form of automatically-generated labels which provide instant visualization to the human for quality assessment. The invention also provides tunable model parameters to steer the interactive process and parallelization of localized models for specific issues. All of this dramatically increases the efficiency of the labeling process in comparison to the conventional active learning approach.

The present invention uses instant feedback cycles and is initiated by setting up a machine learning process (a global model for the whole project and local spawns for specific training items that feed back into the global model) that runs in parallel with the interactive labeling being performed by the human labeler. By receiving live feedback from the machine learning process during labeling, labelers know which areas in an image are already "understood" by the model, and which areas require more attention. This allows labelers to generously skip over large portions of an image and thereby drastically reduce labeling time per image.

The result is highly effective sparse labels added to an image that capture the essence of the labeled data set. Using this approach, we experience a significant boost to a deep-learning project's development speed in all phases, from prototype to production. Each sparse label added by human operators is automatically expanded by a machine learning process to dense labeling that contains predictions for all pixels in an image, along with an estimate of the uncertainty about the predicted class. The visualization of the uncertainty estimate only includes maximum values for a class. Otherwise, the operator would have to handle a visual input of super-positioned overlays of probabilities for various classes. In other words, the operator only sees the best predictions in the model visualization with the highest certainty without overlays of classes.

Machine learning engineers working on the global training process for a project can leverage both sparse and predicted dense labels as well as the uncertainty maps, to get the most out of the data. Finally, snapshots (each snapshot being a local model created for a specific training item for a project) of the globally-trained model from the global training process are fed back regularly to the labeling process, closing the loop and thereby further enhancing efficiency.

This novel approach surpasses current products on the market by offering the ability to create, and instantaneously test and amplify, human annotations on visual input data such as images. Interactive labeling is a hybrid approach that builds on the interaction between humans (who provide annotations and feedback on auto-generated results) and machine learning components (using human-generated sparse labels to predict labels).

In general, state-of-the-art approaches are inefficient since labelers are forced to spend a significant amount of time on highly repetitive tasks (e.g., labeling the same type of building or water body over and over again), most of which does not necessarily contribute to the accuracy of the later-trained deep-learning model. The present invention follows an interactive learning approach (also called "human-in-the-loop"). This means that the approach aims at efficient choices of sparse labels during training epochs to achieve fast convergence of a learning algorithm.

Three features of the present invention are especially innovative: 1. the way the human operator interacts with the system—the user amplifies the accuracy of the system and also evaluates results; 2. the high-speed feedback cycles based upon the human annotations of less than about five seconds; and, 3. the feedback cycles between the various local models and the global model that boost the accuracy of the prediction process.

The source images originate from any suitable source. Any visual source data can be processed that is standardized in machine-readable form, e.g., images such as geoTIFF or PNG. There is also the ability to combine different input formats like RGB, thermal imaging or radar visualizations (e.g., synthetic aperture radar) of the same geographic area. This allows for the creation of corresponding and mutually-enhancing labels for the same area by using different visual wavelengths. Further, the present innovation is not limited to 2-D visual data. The invention may also be used to label 3-D input data (e.g., point cloud scans), video data or non-visual tasks such as natural language processing or speech recognition.

Another key advantage of the present invention is the minimization of the click-rate of the human annotator to generate high-quality training material. The annotator is in control of the whole labeling workflow through an interface: an image is annotated by the annotator and quality-control of the effect of the new labels on the local model is performed instantly. Therefore, the focus of the overall training material generation is steered according to a deep-learning project's needs.

In a first embodiment an image is labeled in a first window of a software tool on a user computer and these labels are sent to a global computer model on a backend server computer. The global model produces a prediction mask having additional labels which is displayed over the image in a second window of the software tool. A corresponding system is also arranged to implement this embodiment.

In a second embodiment a global computer model of a backend server computer receives a labeling mask from a user computer which is combined with the image corresponding to that labeling mask. The global model processes the mask and image and produces a prediction mask having additional labels which is then sent back to the user computer and displayed on a screen. A corresponding system is also arranged to implement this embodiment.

In a third embodiment a backend server computer receives a command from a user computer to spawn a local computer model from a global computer model which results in the global model being copied into a new process and being executed as the local model. Labeling masks from the user computer are received and processed at the local model and the local model only receives labeling masks from that user computer. The local model produces a prediction mask having additional labels which is then sent back to the user computer and displayed on a screen. A corresponding system is also arranged to implement this embodiment.

In a fourth embodiment a software tool on a user computer displays an image in two different windows on a display screen. The tool sends a user command to a backend server computer to spawn a new local computer model from an existing global computer model. Further labeling masks from the user computer are output to the local model on the backend server computer in order that the local model produces a prediction mask having additional labels. The prediction mask is received at the user computer and is displayed in a second window of the tool over the image. A corresponding system is also arranged to implement this embodiment.

BRIEF DESCRIPTION OF THE DRAWINGS

The patent or application file contains at least one drawing executed in color. Copies of this patent or patent application publication with color drawings will be provided by the Office upon request and payment of the necessary fee.

The invention, together with further advantages thereof, may best be understood by reference to the following description taken in conjunction with the accompanying drawings in which:

FIG. 9 illustrates the live-labeling interface of the labeling tool in which the operator has zoomed in.

DETAILED DESCRIPTION OF THE INVENTION

Embodiments of the invention include these innovations and advantages. A human operator provides sparse labels via a labeling mask over an image and feeds the annotated image of sparse labels into a back-end system; a ML process then provides predicted dense labeling (in the form of an output mask) based on the human's sparse labels. The human operator and the back-end system of a labeling tool are in a constant feedback loop via the operator input labeling mask and the output prediction mask; this increases the accuracy and quality of the output. The visualization of the ML predictions is observed by the operator in the output prediction mask within a few seconds. The output are accurate dense labeling masks for a chosen ML training project.

The back-end system itself incorporates a feedback loop between the global and local models that boosts the overall performance of the back-end system. Also, the spawning of local models may occur in parallel. The local and global models may run with varying hyper-parameters; this enables faster feedback since changing parameters shows more effect in local models. Hyper-parameters influence the result, but do not stem from the data itself. These hyper-parameters are used for fine-tuning, e.g., modifying the learning rate or the dropout rate (discarding of preliminary results to avoid overfitting).

The following first illustrates the innovative learning cycle, the interactive labeling system and the parallel local models, followed by a series of screenshots that provide an overview of the workflow and basic tool functionalities. Detailed flow diagrams then follow that refer back to the screenshots.

Figure 1:
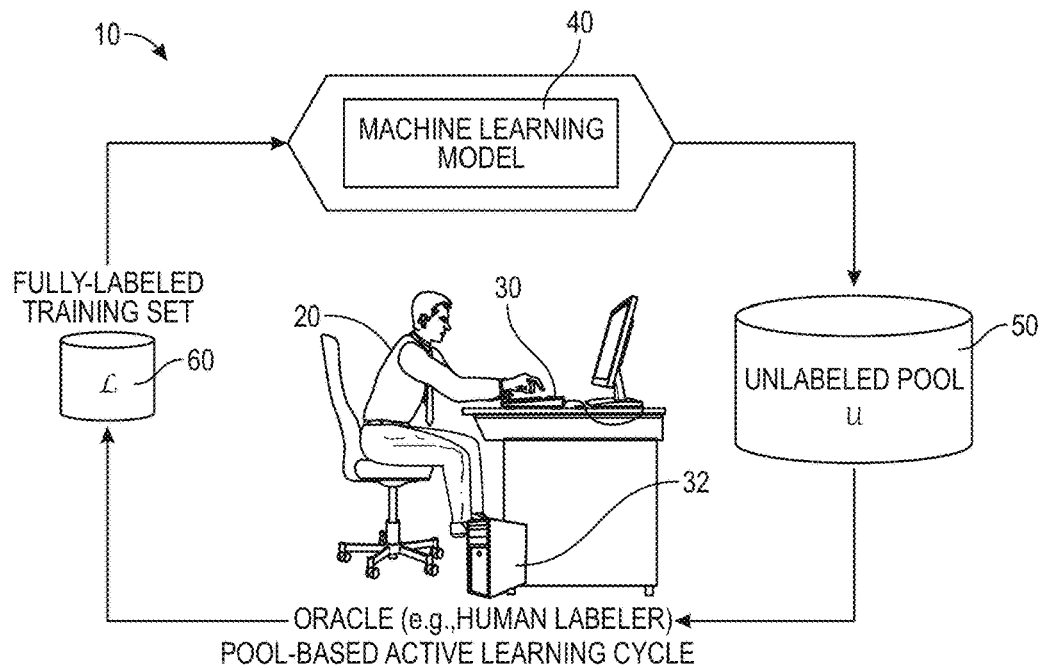
FIG. 1 illustrates a prior art active learning cycle.
Figure 2:
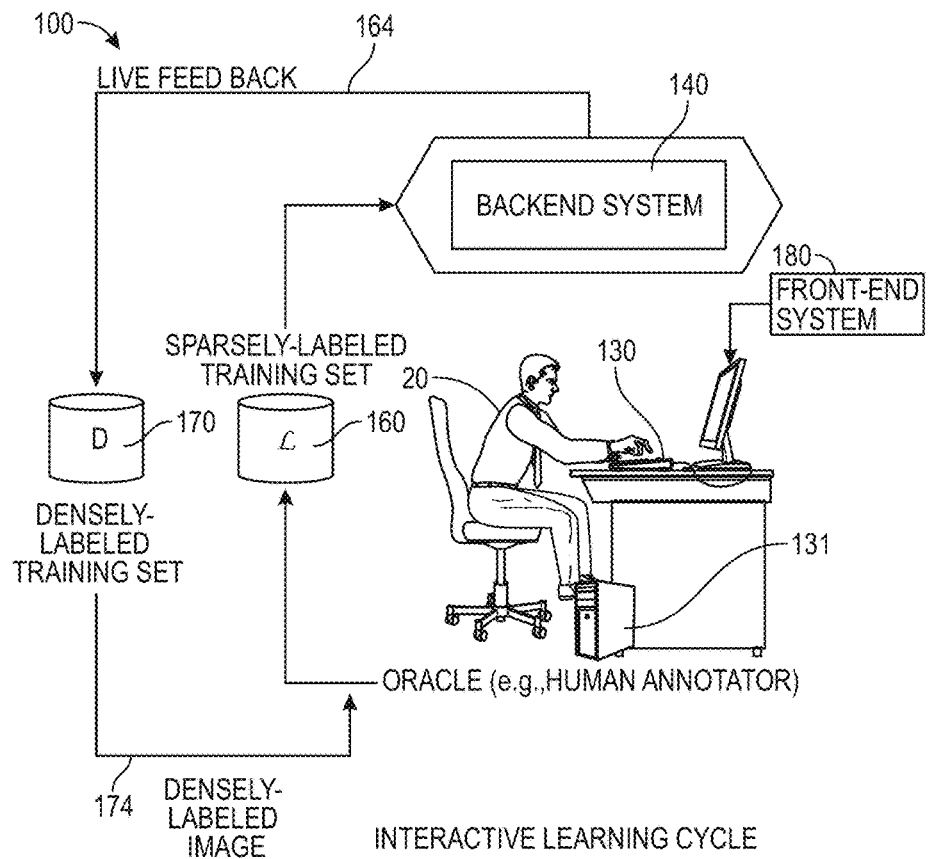
FIG. 2 illustrates an interactive learning cycle of the present invention.

FIG. 2 illustrates an interactive learning cycle 100 of the present invention. Similar to FIG. 1, cycle 100 includes an operator 20, and a laptop computer 130 (or desktop computer 131). The operator produces a sparsely-labeled set 160. Back-end system 140 produces live feedback 164 in the form of densely-labeled training set 170 (a collection of densely-labeled images 174), which images are displayed on computer 130 by front-end system 180. Back-end system 140 typically executes upon a remote server computer (i.e., "in the cloud") accessible over the Internet by the front-end system 180, and may be implemented by the same enterprise that implements the front-end system, or may be implemented by a cloud computing service. System 140 may also execute upon computer 130, 131. Immediate feedback is in the form of a densely-labeled image 174 displayed on the operator computer. An unlabeled pool of images to be labeled by the human annotator is typically stored within the back-end system and an image or images are downloaded to the front-end system as needed by the human answer.

Interactive Labeling System

Figure 3:
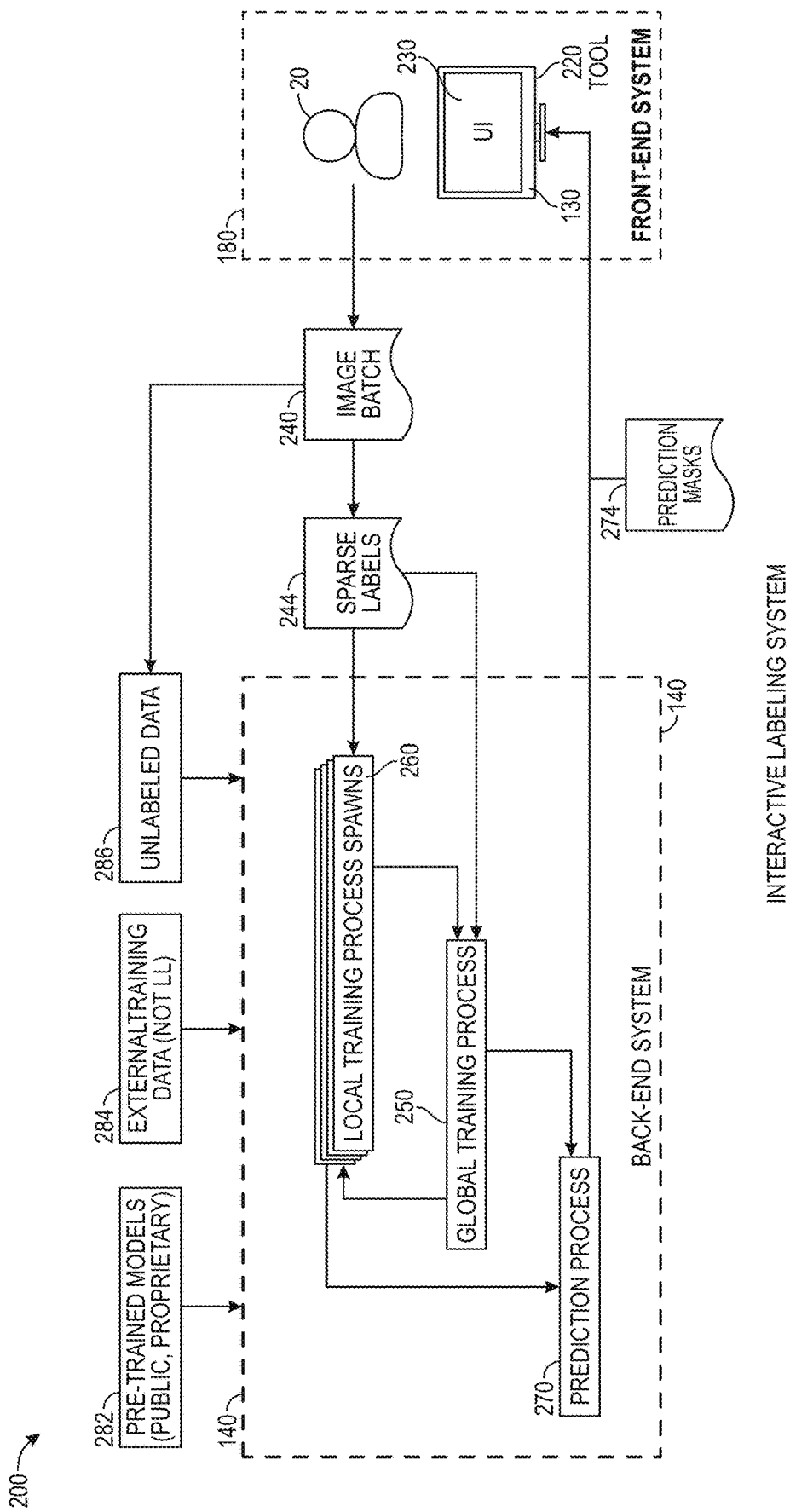
FIG. 3 is a block diagram of the interactive labeling system in greater detail, implemented via a labeling software tool which includes a back-end system and a front-end system.

FIG. 3 is a block diagram of the interactive labeling system 200 in greater detail, implemented via a back-end system 140 and front-end system 180. The human operator 20 works with the front-end (FE) 180 including the labeling software tool 220 that displays a user interface (UI) 230 on a computer workstation 130. Although not shown, there may be any number of front-end systems each sending data to, and receiving data from, the back-end system 140. In other words, there may be any number of operators 20 each annotating (in parallel or serially) a different image from a batch of images, these annotations all being processed by the global model in real time (and affecting outputs to other operators) and perhaps being processed by a local model if an operator chooses to spawn a local model as will be discussed in greater detail below.

For every labeling project a region is defined that is downloaded to workstation 130 as an image data batch 240 (e.g., a region from a geo-data set). The human views an image on UI 230 and then annotates on a per-image basis of the region (e.g., RGB satellite images displaying a suburban residential area) to produce sparse labels 244 for a particular image which are then input into the global model (process 250) and also into a local model (process 260) if used. Typically, the sparse labels take the form of a labeling mask produced by the human using the user interface as described below. As the image being labeled is already stored within the back-end system, it is not necessary to send the image along with the labeling mask from the front-end system to the backend system, but the image may be sent if desired. The output labeling mask from the front-end system including the sparse labels 244 is then combined with its corresponding image before being input into the global model, local model, or both. As described in more detail below, annotations are sent continuously from the front-end as they are made by the human but they may also be sent altogether at discrete intervals. Operator 20 uses several UI tools to mark features in the image and group them to a predefined label class (see UI workflow below).

Figure 5:
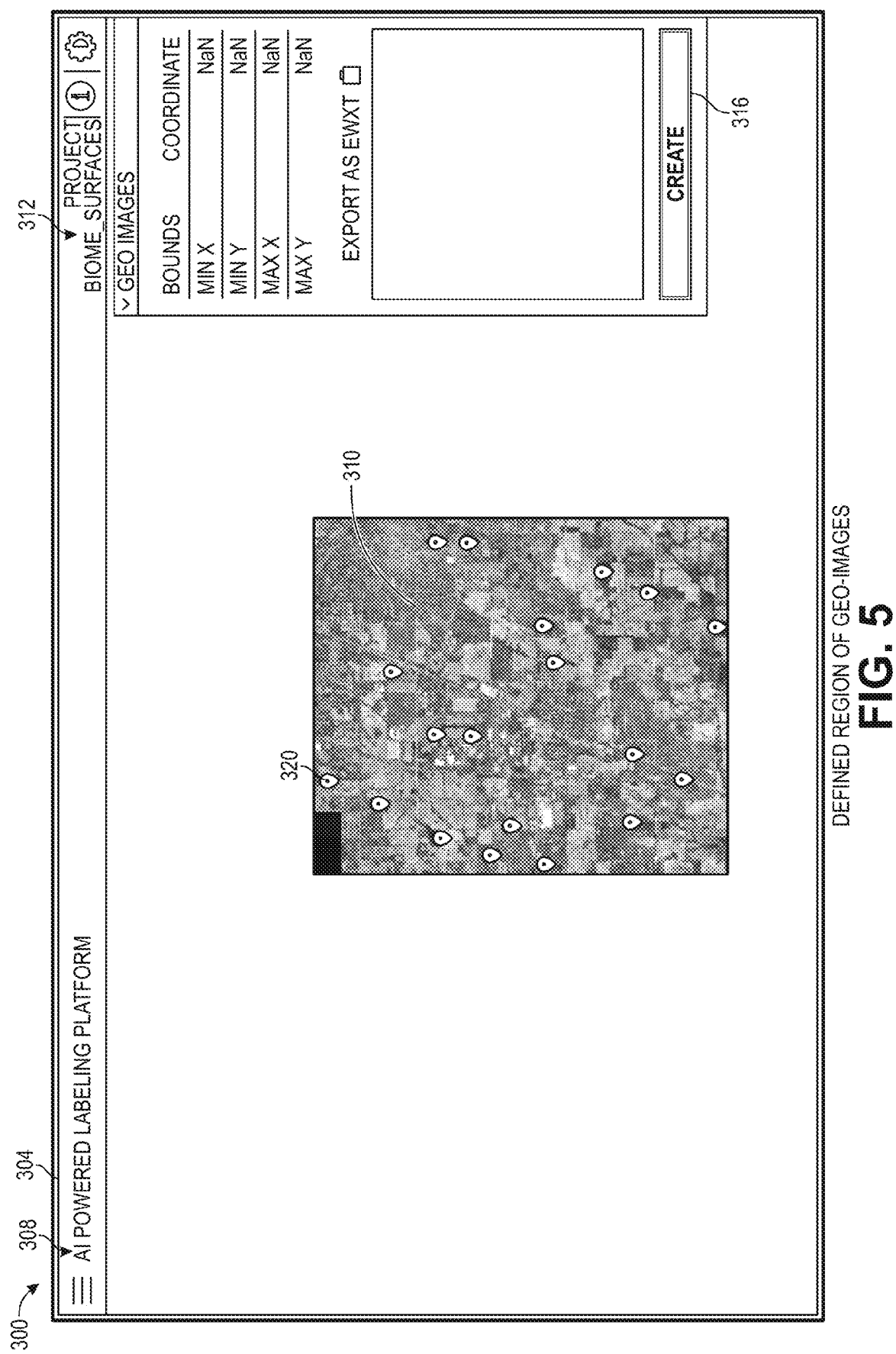
FIG. 5 illustrates a defined region of geographic images viewed within a front-end system.

For each project, that is, for the batch of images in a selected region, a global model is assigned and represents that batch of images (e.g., the batch of images in FIG. 5 shown in region 310). Thus, no matter how many operators are annotating images from that batch, all annotations (that is, the sparse labels) are fed into the global model which learns from the images in that batch. Therefore, an operator opening a new image in that batch will benefit from annotations from other images that have previously helped to train that global model. In addition, operators spawning local models will also contributes to the training of the global model as those annotations are also fed into the global model.

The back-end system (BE) 140 may include processes that run in parallel and feed back into each other: 1. the global training process 250 (global model); 2. local training processes 260 (spawns of the global process, local training models); and 3. a prediction process 270 that utilizes these models to produce prediction masks and then sends the prediction masks 274 on a per-image basis back to the client computer 130. A snapshot of the global model (i.e., a local model spawned from the global model of a project) may be taken from the training process at regular intervals. The snapshot model is applied to the annotated input image from the operator to create an up-to-date prediction mask which is then output to the operator UI 230. Typically, it is only the prediction mask 274 which is sent back to the front-end system where it is combined with its corresponding image in order to be displayed in the user interface, although it is also possible to send back the prediction mask combined with its corresponding image.

More specifically, the prediction process 270 is the application of the trained local/global model (depending upon the UI settings; the annotator may switch between a local or the global model) on an image from a project. For example, for a project we may train the global model to detect swimming pools within aerial images of a suburban area. We thus train the model with sparse labeling in a selected set of locations of the whole project. Then, we apply the trained model on an unlabeled image or the whole project area (which is not labeled yet), which is also called "inference." This cycle of labeling and receiving feedback happens with every training iteration ('epoch' in machine language terminology) that takes from about 0.1 to about 5 seconds depending on the model settings. Other words, the prediction mask is updated in the user interface from about every 0.1 to about every 5 seconds, a training iteration.

The machine learning models use conventional neural networks that are pretrained for the given task. The internal training of these models leads to high performance. We use a semi-supervised learning approach to train the neural networks of the back-end system. It can be applied on all kinds of two-dimensional (2-D) and three-dimensional (3-D) input data to generate dense semantic labels. Label categories are thereby organized in classes such as "water body", "asphalt", "forest", etc. The number of classes can be arranged according to the needs of a specific project and are defined in the back-end system or by the annotator directly in the front-end system That is, the label classes are not only defined in the BE, but also an operator can add and arrange labels in the user interface.

Three additional data sources feed into the BE system 140 components besides the annotations 244 of the operator 20. All the three sources help to increase the accuracy of the global and local training processes: data from public or proprietary pretrained models 282; external training data that is not live labeled (not LL, e.g., OSM data) 284; and unlabeled data 286 from the selected image pool 240 that is used by the system 200 to generate auto-generated-labels. The unlabeled data 286 is the actual project area. By way of example, a 10-by-10 kilometer aerial image composition (a project) obtained from satellite images is loaded into the back-end system as a geoTIFF file. Images may be received from an image provider company, and may originate from satellite images or other aerial source, etc. The annotator then chooses an area of interest for sparse labeling in this project area. Auto-generated-labels are the labels that are guessed by the system 200 based upon annotations made by a person and are displayed in the prediction mask 274. They are generated in training loops between the local and the global training processes. The model thereby assumes that, e.g., an object next to a labeled house is likely also a house due to similarities.

In general, the useful and advantageous outputs of the back-end system include the labeled images for training (i.e., a labeling mask together with its corresponding image) which may be stored in persistent storage of the back-end system, and the trained global model of the back-end system.

Interaction of Global Model with Parallel or Sequential Local Models

Figure 4:
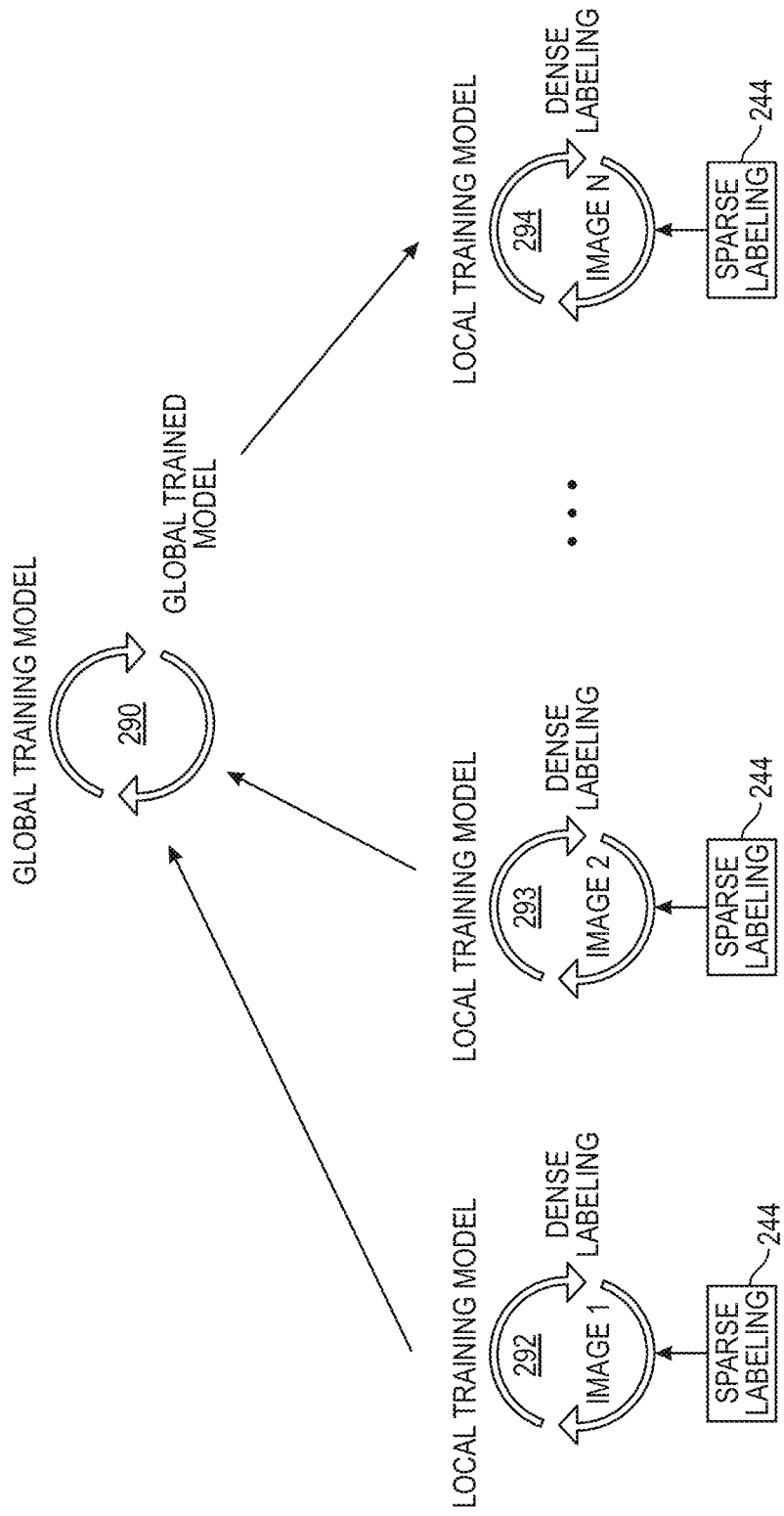
FIG. 4 illustrates an overview of parallel local models.

FIG. 4 illustrates an overview of local models and their interaction with the global model. Even though a global model can be very comprehensive, it can also be slow to update and to provide feedback. Whereas a global model may need to process hundreds of thousands of labels and features from dozens or hundreds of images in a batch of images in a defined project area, a local model can focus on perhaps hundreds of labels of a single image in order to improve labeling of the features in that image.

Shown is feedback from local models and local model spawning. In this example, an operator or operators have spawned local models 292 and 293 which are executing in the back-end system and providing continuous feedback to the global model 290 (also executing within the back-end system) in the form of sparsely labeled features from the operator. Local models 292 and 293 may be local models executing in parallel, each being used by a different operator simultaneously working on different images, or, local models 292 and 293 may be the result of the same operator working on different images sequentially. As described in more detail below, as each operator uses his or her local model, the feedback from those models (indicated by the arrow) continuously delivers sparse labels to the global model for training. At some point in time, an operator may wish to spawn a local model (described in more detail below) and will execute a spawn command in order to spawn a new local model 294 (as indicated by the arrow) thus resulting in a new local model for a particular image that the operator may then annotate.

Each local model 292-293 executes in the back-end system and delivers enhancements for a certain labeling issue and feeds back these sparse labels into the global model 290. Thus, the live labeling tool itself envelops two interconnected training processes: the global model and the local models of the training. The global model contains all of the training data on a specific task, optional external data sets (e.g., Open Street Map data or other third-party data sets) and all self-produced data in general. The global model is preferably the best installment of the current model. A local training model 294 may be spawned from the current global model 290 at any time by an operator. It contains all of the features of the global model and may be modified without any immediate impact to the global model. Therefore, a local model can also serve as a quality assurance installment for the global model. Changes in a local model can be observed in-time and fed back to the global training to enhance its overall performance.

A local model also runs in the back-end system and is typically created when there is a specific labeling item or class that needs to be improved. Contrary to the global model, a local model only applies to a certain area of interest, or image, of a project. E.g., if there is an area in which it is ideal to label bushes (that is, it clearly has lots of bushes) a local model may be spawned and trained specifically to detect bushes (on a portion of the whole project). When the predictions are satisfactory for the one specific image, the training of the local "bush" model is fed into the global model to boost the overall performance on the whole project (the complete aerial image data). Preferably, annotations on a local model (e.g. on these bushes) are fed continuously into the global model as they are made by the operator, but may be fed back all at once when the operator has finished with the local model. In other words, every time an operator annotates and labels an image in the user interface, this annotation is fed back not only into the local model but also into the global model.

A local model, when spawned, is therefore spawned for a specific image of a project. The annotator can switch between the global and a local model for a prediction mask of a certain image area in a project. So, depending on the case, the global as well as a local model may each create prediction masks. The main reason to spawn a local model is to improve on a specific class without the interference from other classes of the global model, and then apply the improvements to the global model. In other words, once a local model is spawned it only receives sparse labels from that operator annotating the single image from which the local model was spawned. As explained in more detail below, a local model may be spawned by the operator clicking upon a button in settings.

In one example, the operator spawns a local model in order to focus upon features of a single image. When done working for the day, the operator shuts down that local model and the global model continues to execute and process information throughout the night. The next day, the operator may then spawn a new local model which will then have all of the information of the global model that has been improved overnight.

Screenshots Showing a First Exemplary Workflow

FIG. 5 illustrates a defined region of geographic images 300 viewed within a front-end system 180. Shown is a window 304 of computer 130 executing within a live labeling software tool having a name as shown at 308. A batch of geographic images 310 is shown within the window and has a particular project name 312. The operator has the ability to create 316 a particular area of interest in order to perform labeling on an image. Markers 320 indicate areas of interest for labeling that have already been selected.

Figure 6:
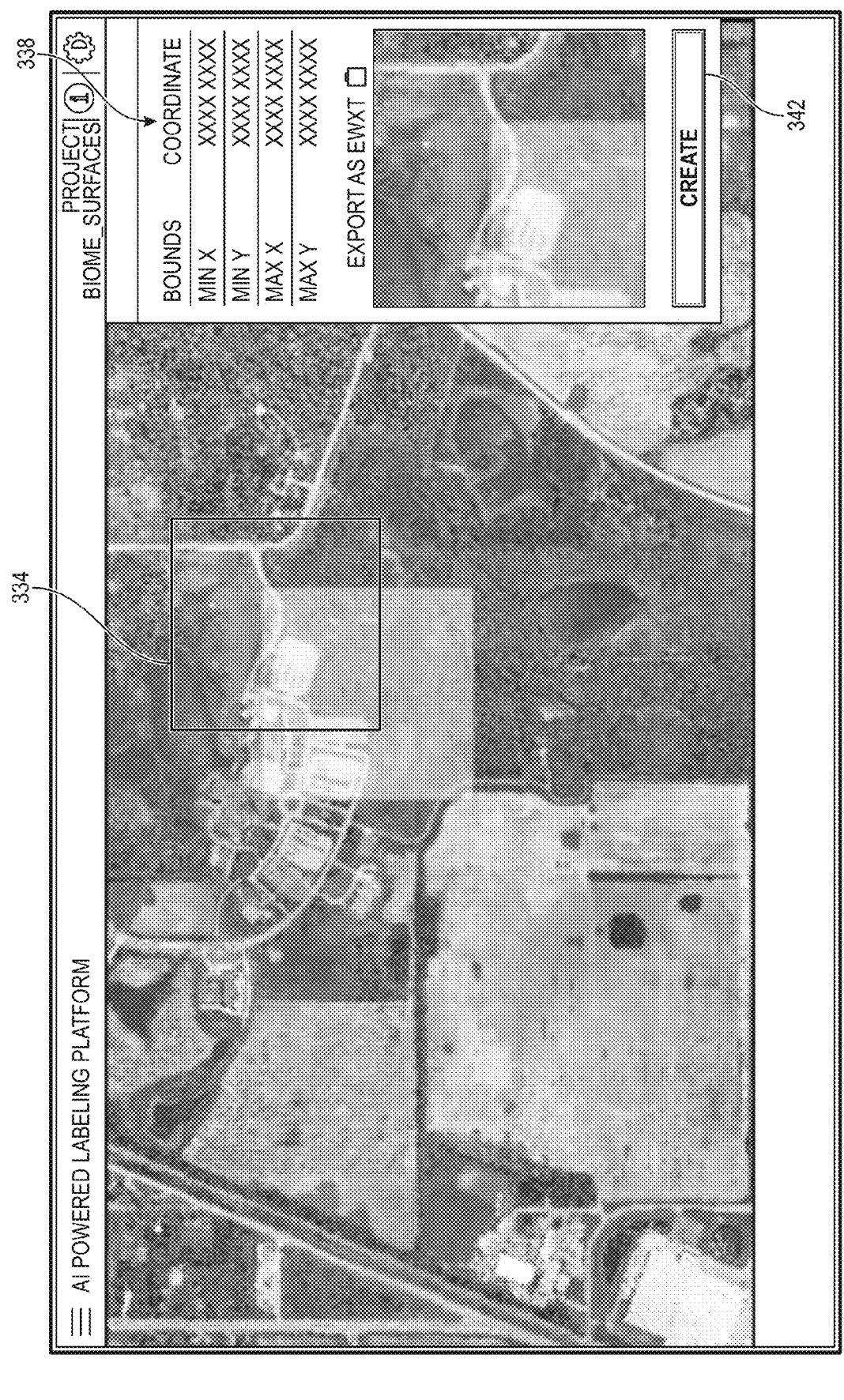
FIG. 6 illustrates a selected area of interest within the defined region of geographic images.

FIG. 6 illustrates a selected area of interest within the defined region of geographic images. Shown is the selected area of interest 334, a control panel 338 used to select that area, and command 342 used to select that area and open the live-labeling interface.

Figure 7:
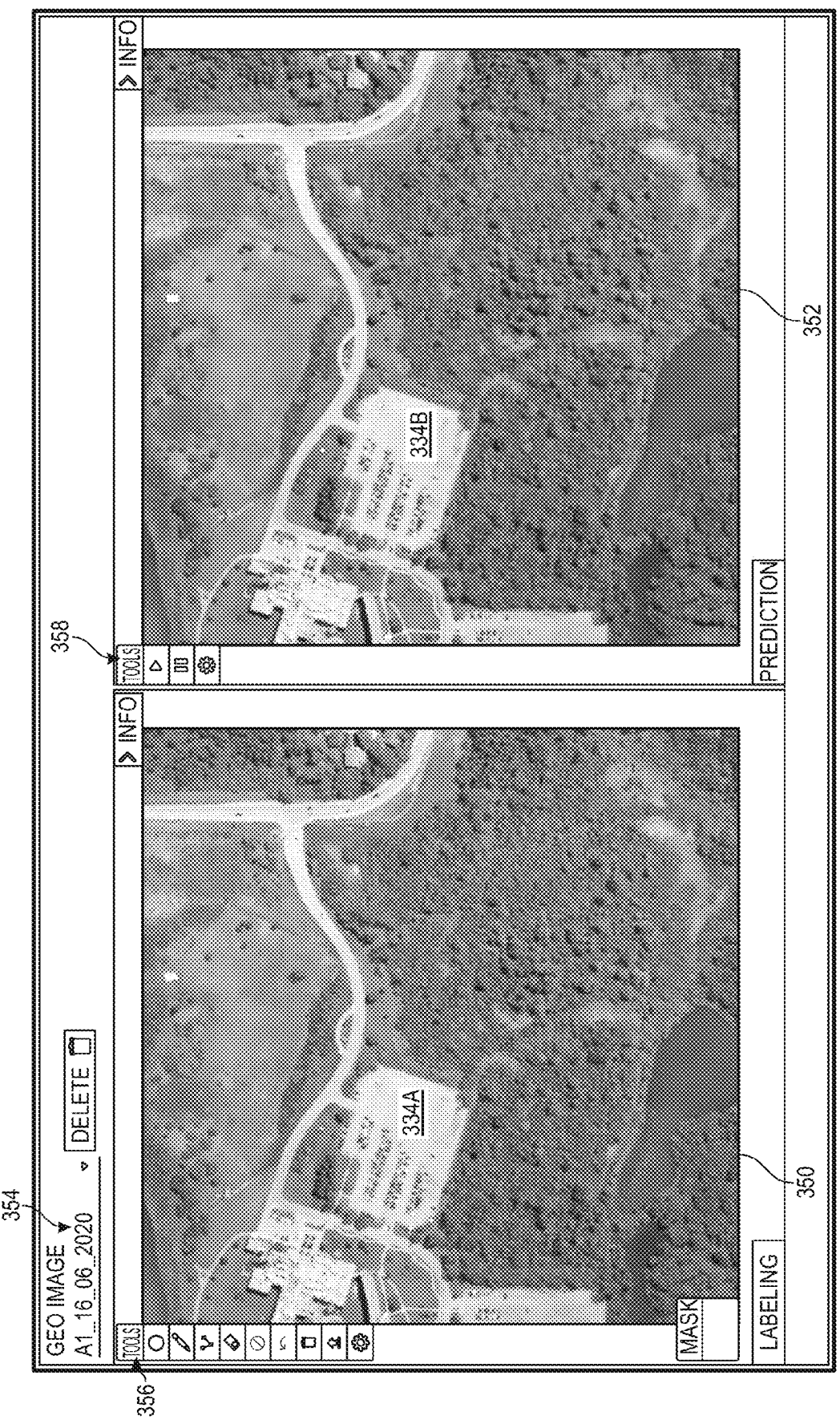
FIG. 7 illustrates the live-labeling interface of the labeling tool.

FIG. 7 illustrates the live-labeling interface of the labeling tool. Once opened, a file is opened in order to store the area of interest and annotations added by the operator; the file is then loaded into the live-labeling interface. As shown, the live-labeling interface includes a window 350 on the left-hand side (the labeling window) and a window 352 on the right-hand side (the prediction window). Window 350 includes an image of the selected area of interest 334*a* that will be labeled by the operator, and window 352 includes the same image 334*b* that will show the automatically-generated labels from the back-end system 140 (that will be made on the basis of the annotations from the operator once the operator clicks the play button 358). Shown is a file name at 354 and various tools available 356.

Tools 356 include from the top: a color palette that may be expanded, a pencil tool, a line drawing tool (to label roads), an eraser tool to delete annotations or parts of them, a circle with a slash tool that sets back all labels in an image, a back arrow tool that skips one action backward, a trash tool icon, an upload tool icon and a settings icon. Other tools are described below.

Tools 358 in window 352 include a play button to begin the automatic generation of labels, a pause button and a settings button. The pause button is used to stop the visualizations of an ongoing learning process by the local or global model. The training is always going on in the background in the back-end system. The pause button is a feature to give the annotator the option to stop the occasional flickering of visualized prediction masks on the right-hand side of the screen. As shown, currently both images 334*a* and 334*b* are the same because the operator has not yet begun annotating image 334*a* nor pressed "play."

Figure 8:
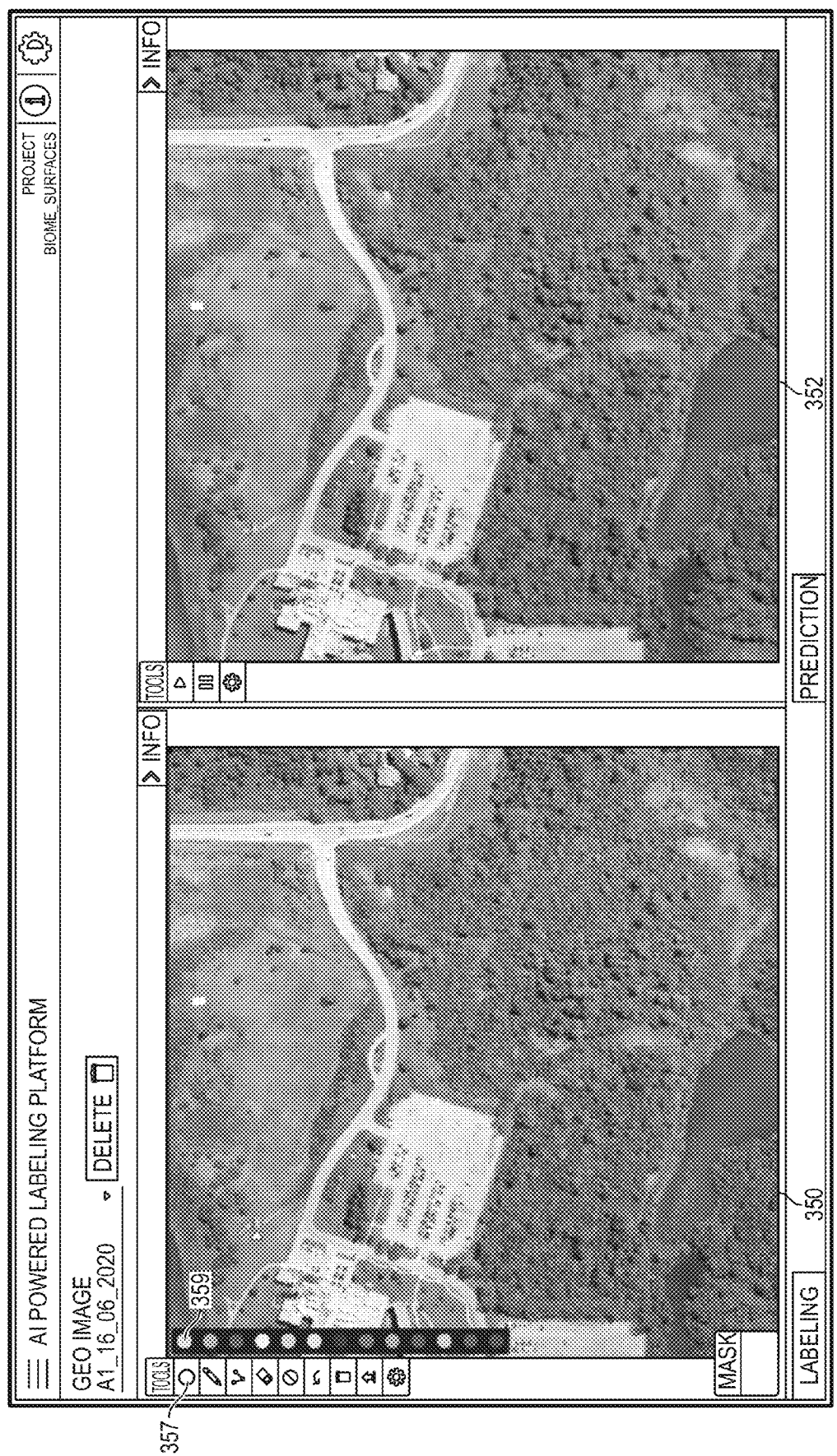
FIG. 8 illustrates the live-labeling interface of the labeling tool and the expanded color palette.
Figure 15:
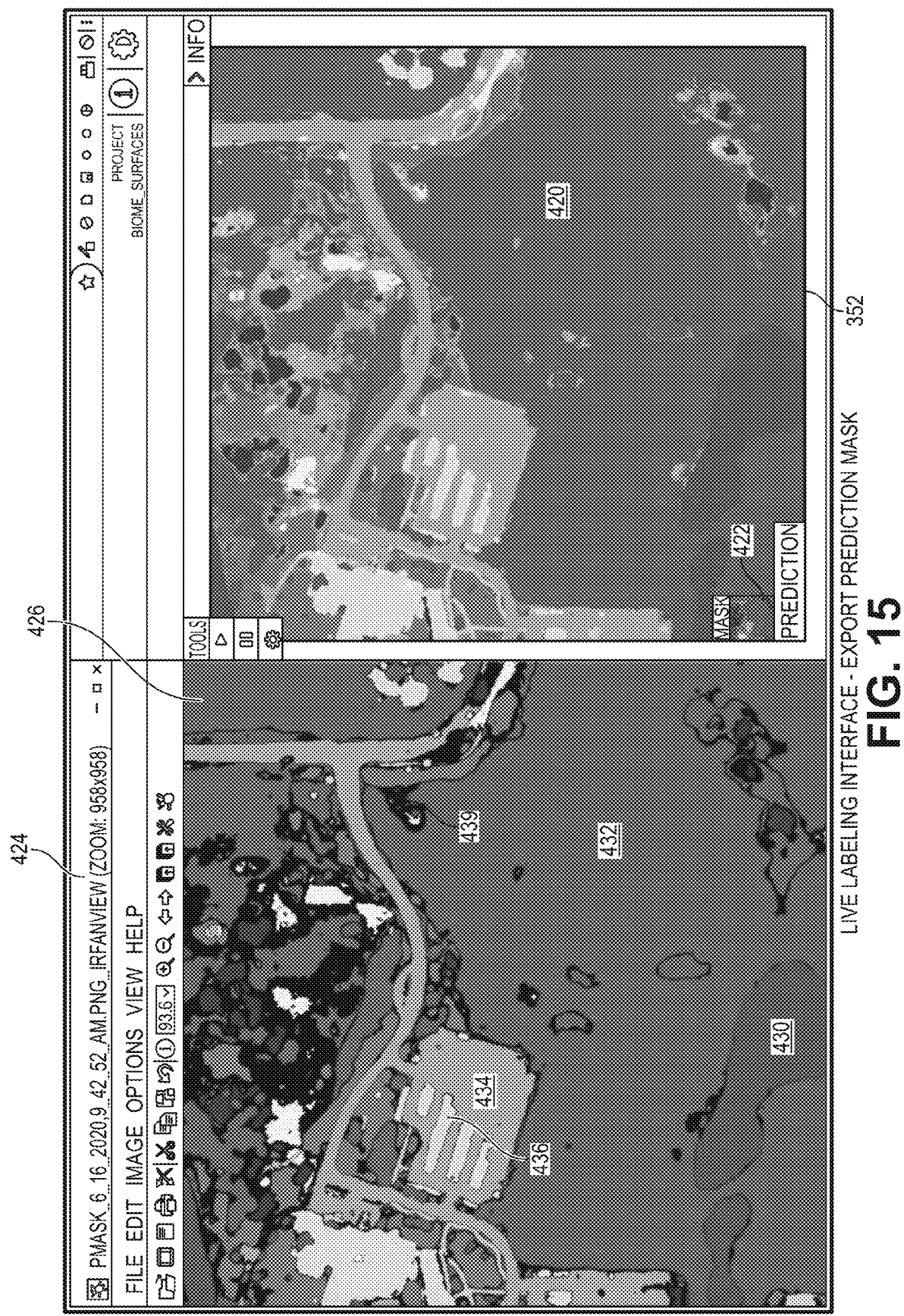
FIG. 15 illustrates the live-labeling interface and how the prediction mask may be exported as well.
Figure 16:
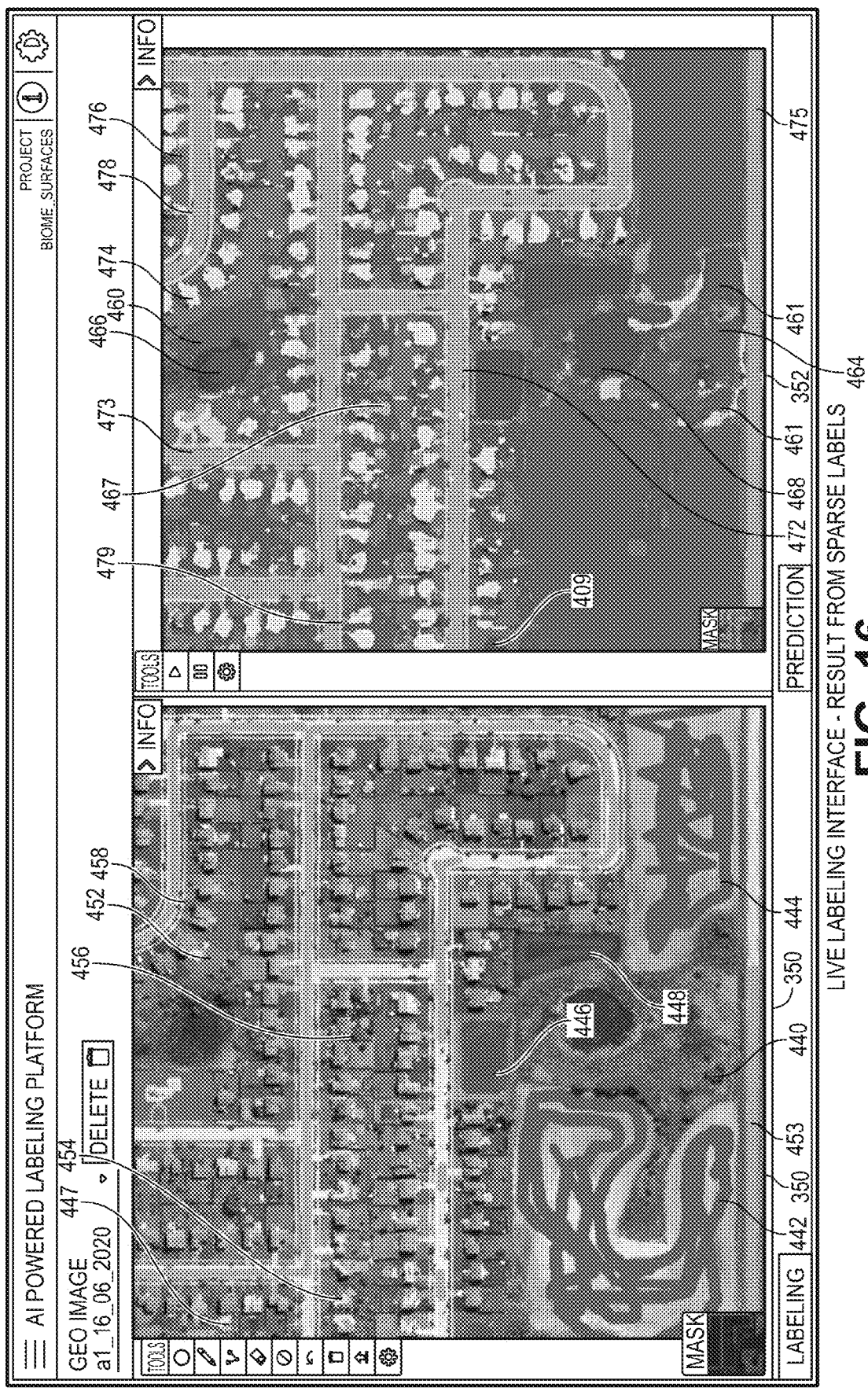
FIG. 16 illustrates the live-labeling interface and the effectiveness of the system in using sparse labels.

FIG. 8 illustrates the live-labeling interface of the labeling tool and the expanded color palette. The operator brings up the color palette by clicking button 357. Color palette 359 includes various colors, each representing a predefined class. The colors used will depend on the application. Colors are defined in the back-end system depending on the current labeling needs of a project. For example, as shown in FIGS. 9-15, blue is for water, light brown is for roads, yellow is for paths, green is for vegetation, light green is for ground cover, pink is for hard surface (automobiles, building roof, etc.), red is for ground, etc. In FIG. 16, blue is for large bodies of water, light blue for small pools, light brown is for roads, yellow is for paths or walks, green is for vegetation, light green is for ground cover, pink is for houses, red is for hard ground, etc. In another example, shown in FIGS. 20-37 red is for buildings, blue is for roads, pink is for background, and brown is for driveways.

Figure 9:
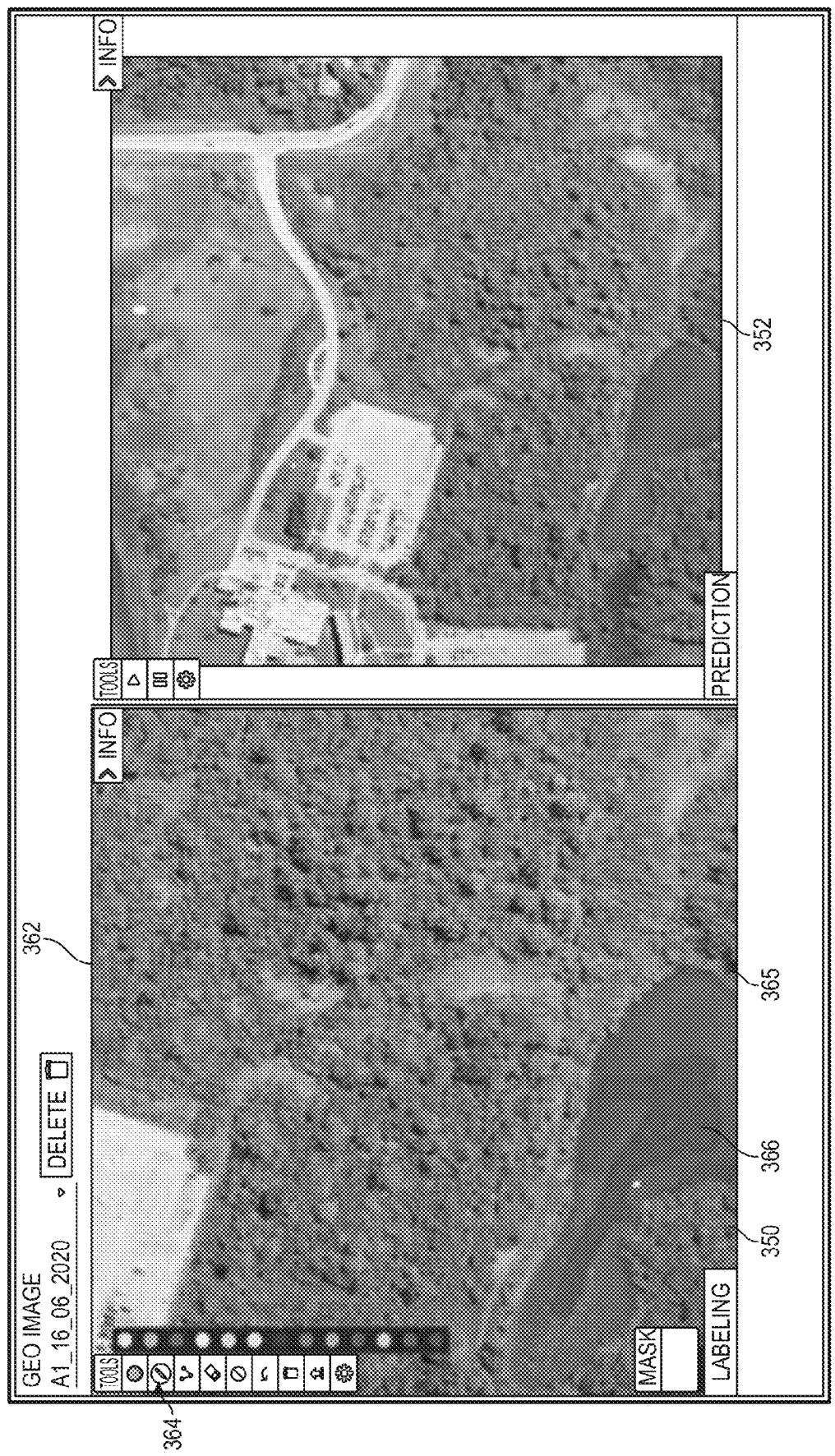

FIG. 9 illustrates the live-labeling interface of the labeling tool in which the operator has zoomed in. As shown, the operator has used a zoom tool in order to zoom in on a particular region 362 of the labeling image 334a. And, the operator has used the brush tool 364 in order to annotate a water body 365 using a few blue strokes 366 of the tool which take up less than half of the water body and do not circumscribe its perimeter. Image 334b in window 352 is as of yet unchanged as the play button has not been selected. The stroke size of the brush tool can be changed under the settings button.

Figure 10:
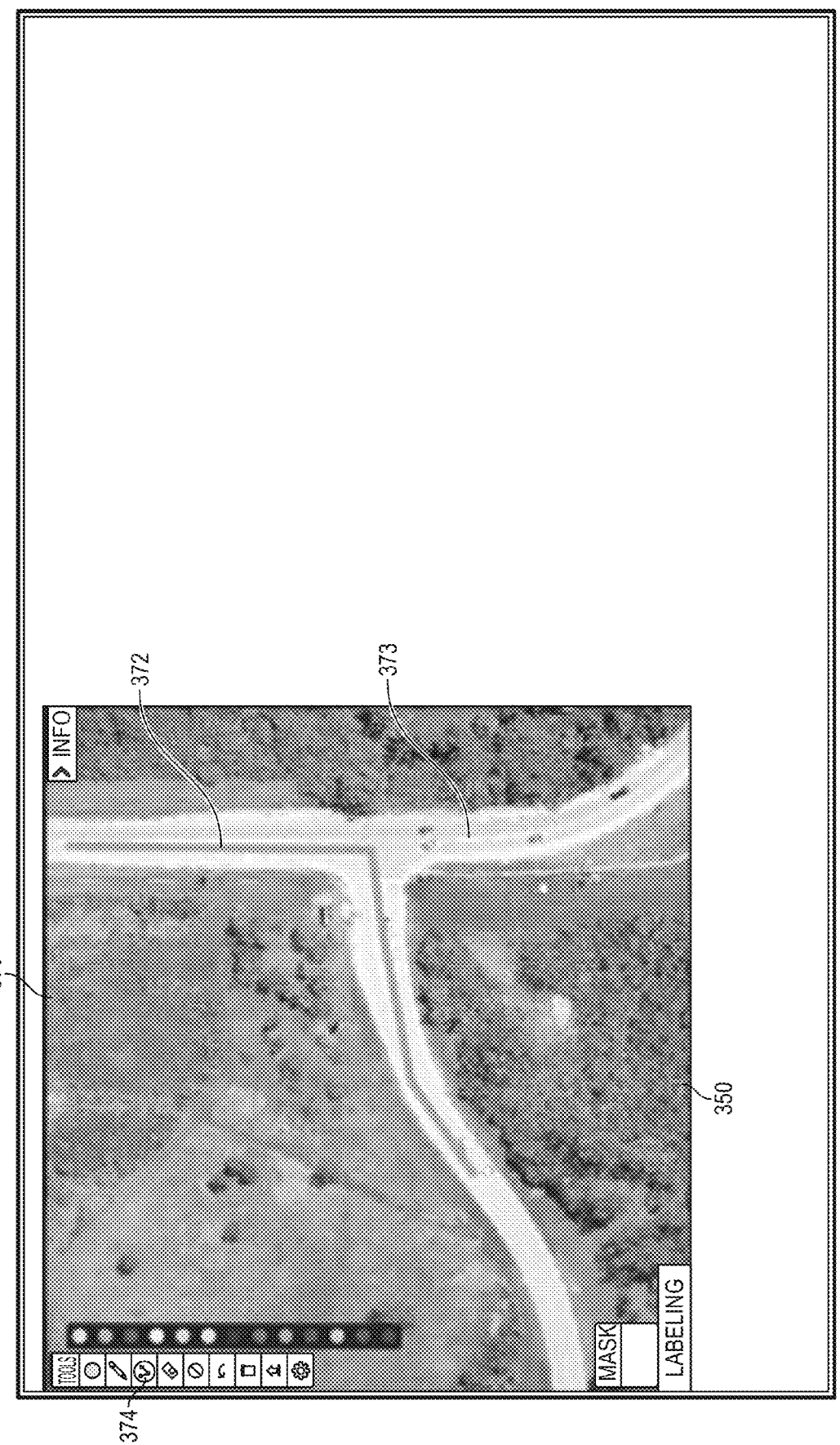
FIG. 10 illustrates the live-labeling interface of the labeling tool in which the operator uses the line tool.

FIG. 10 illustrates the live-labeling interface of the labeling tool in which the operator uses the line tool. As shown, the operator has used the line tool 374 in order to mark a particular road in region 370 (after having used the zoom tool on image 334a). The line tool has been used to annotate the image by marking a gray line 372 on asphalt roads 373. As shown, the line is less than one-quarter of the width of the road, does not extend along the entire length of the two sections shown, and does not extend at all along the bottom portion of the road.

Figure 11:
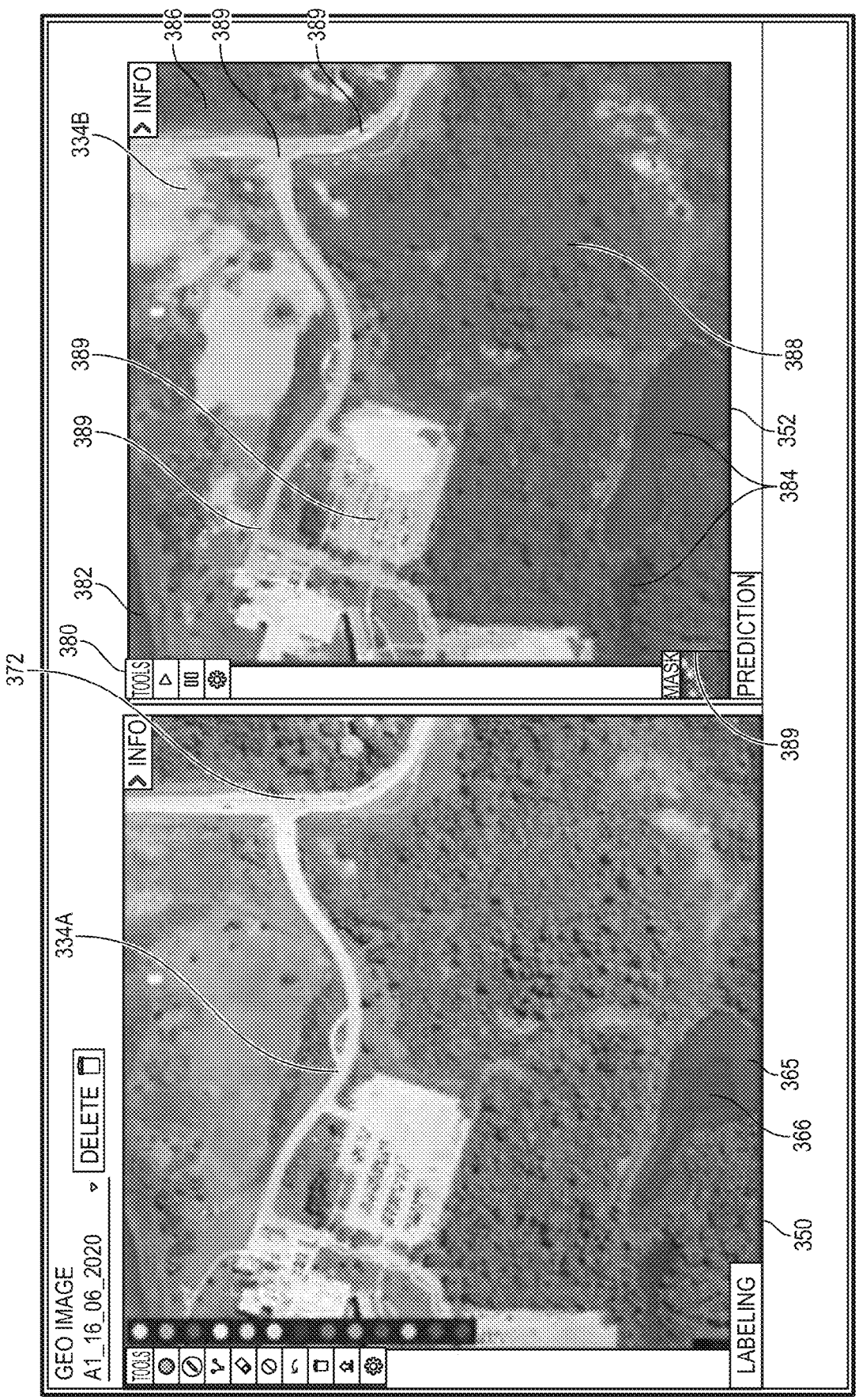
FIG. 11 illustrates the live-labeling interface after the operator has executed the machine learning process.

FIG. 11 illustrates the live-labeling interface after the operator has executed the machine learning process. The operator has selected the play button 380 in order to start the process and produce the results shown in the prediction image 334b. As shown, the sparse labeling used to annotate 366 the water body 365 has resulted in all other water bodies 382 and 384 being labeled as "blue," indicating that the model now understands those features to be bodies of water. Further, the sparse labeling 372 used to annotate the road 373 has resulted in all asphalt areas in the area of interest (all roads and parking lot) now being labeled as "gray," indicating that the model now understands those features to be asphalt 389. In addition, the model has used previously-established training data 284 for this area of interest to label areas 386 and 388 as "green," indicating that the model now understands those features to be vegetation.

Advantageously, the operator can view the effects of his or her annotations in real time as window 352 is updated with color-coded labels for features that have been annotated. And, the operator can skip over annotating those water bodies and asphalt surfaces that have been labeled correctly, thus saving valuable time. An operator may take certain steps if a feature is labeled incorrectly, such as changing the label, cropping it with the "rubber" tool or deleting it. The results of labeling appear quickly in the prediction window. The model iterates between about 0.1 to about 5 seconds, depending upon the model settings. And, the "refresh interval" of the visualization of the prediction mask can be set between about 2-5 seconds.

Figure 12:
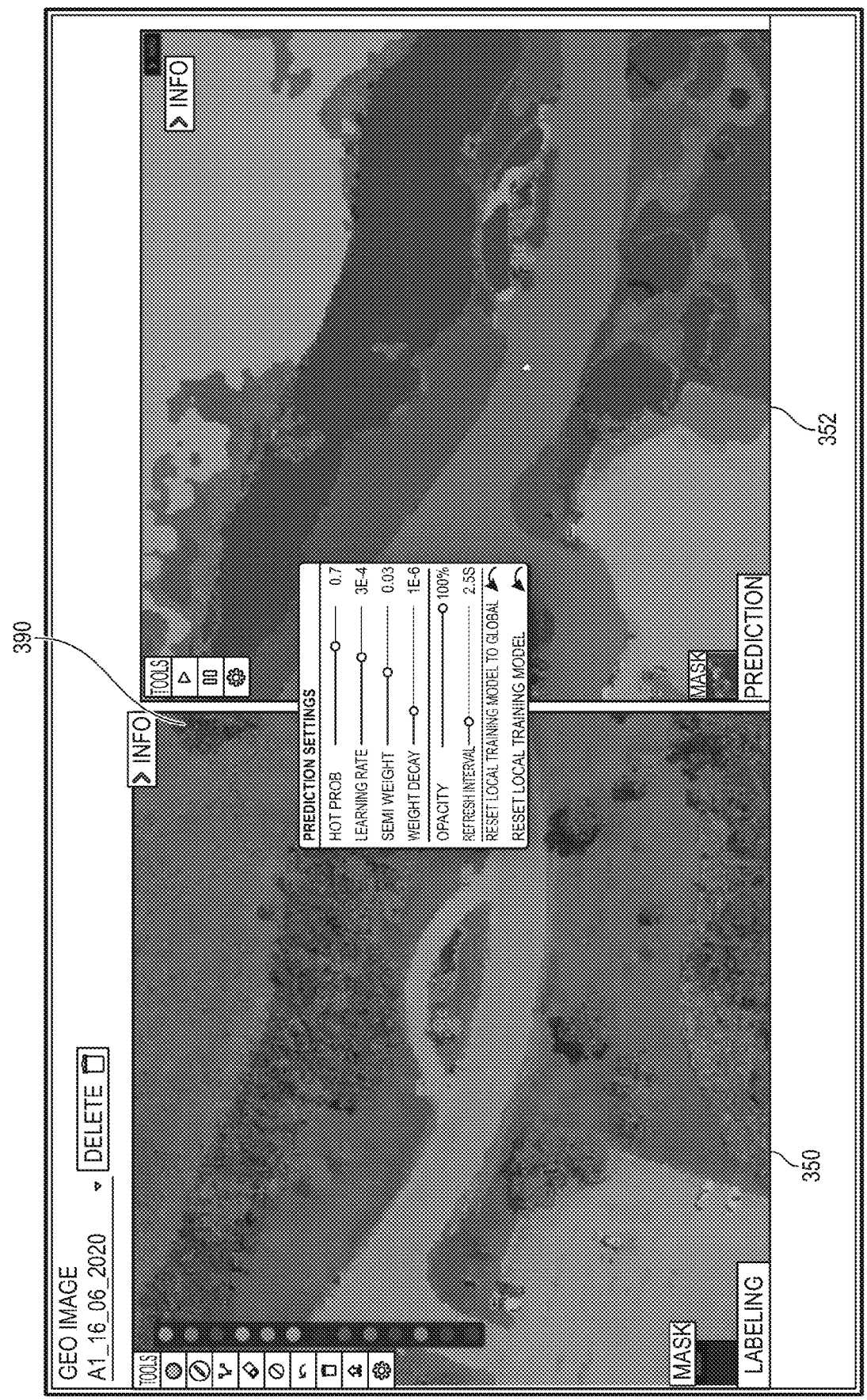
FIG. 12 illustrates settings for the model via the live-labeling interface.

FIG. 12 illustrates settings for the model via the live-labeling interface. By clicking on the settings button, window 390 appears. Learning rate 392 allows the learning rate of the global model to be adjusted. In general, at the beginning of a project the learning rate should be set higher to make faster progress. After the project has progressed, the learning rate may be decreased in order to generate more robust results and to reach the optimal outcome for the project. In general, the learning rate is a tuning parameter in an optimization algorithm that determines the step size at each iteration while moving toward a minimum of a loss function. Since it influences to what extent newly acquired information overrides old information, it represents the speed at which the global model "learns."

Other prediction settings for the model include sliders such as hot probability 391 which determines the usage of the current picture in the LL tool for training of the current model. If it is set on "1" this means that the current image is used all of the time in the model. It is a probabilistic factor that tweaks the learning process in the background. Semi weight 393 is also a probabilistic factor that is a multiplying-coefficient for the loss function that has influence on the learning performance of the model. Weight decay 394 is used in training neural networks and is common where after each update, the weights are multiplied by a factor slightly less than "1". This prevents the weights from growing too large and can be seen as gradient descent on a quadratic regularization term. These above settings are typically not used by a typical annotator.

Opacity 395 changes the opacity of the annotations (less opacity means that the aerial image can show through the annotation for better visualization). The refresh interval refers to the visualization of the training progress (not the machine learning training itself which always continues in the back-end system) and may be changed using slider 396. Each local training model may be reset using buttons 397 and 398. One may wish to reset a local model when the annotations do not lead to a satisfactory outcome (i.e., an accurate and usable prediction mask). Basically, one starts fresh based on the current global model for a certain portion of the project area for a certain class. E.g., if one chooses one area of the project to improve the detection of cars using a local model, but the results are not good on the local model and should not be transferred into the global model, then, you set the local "car" model back to the global model and start fresh.

Figure 13:
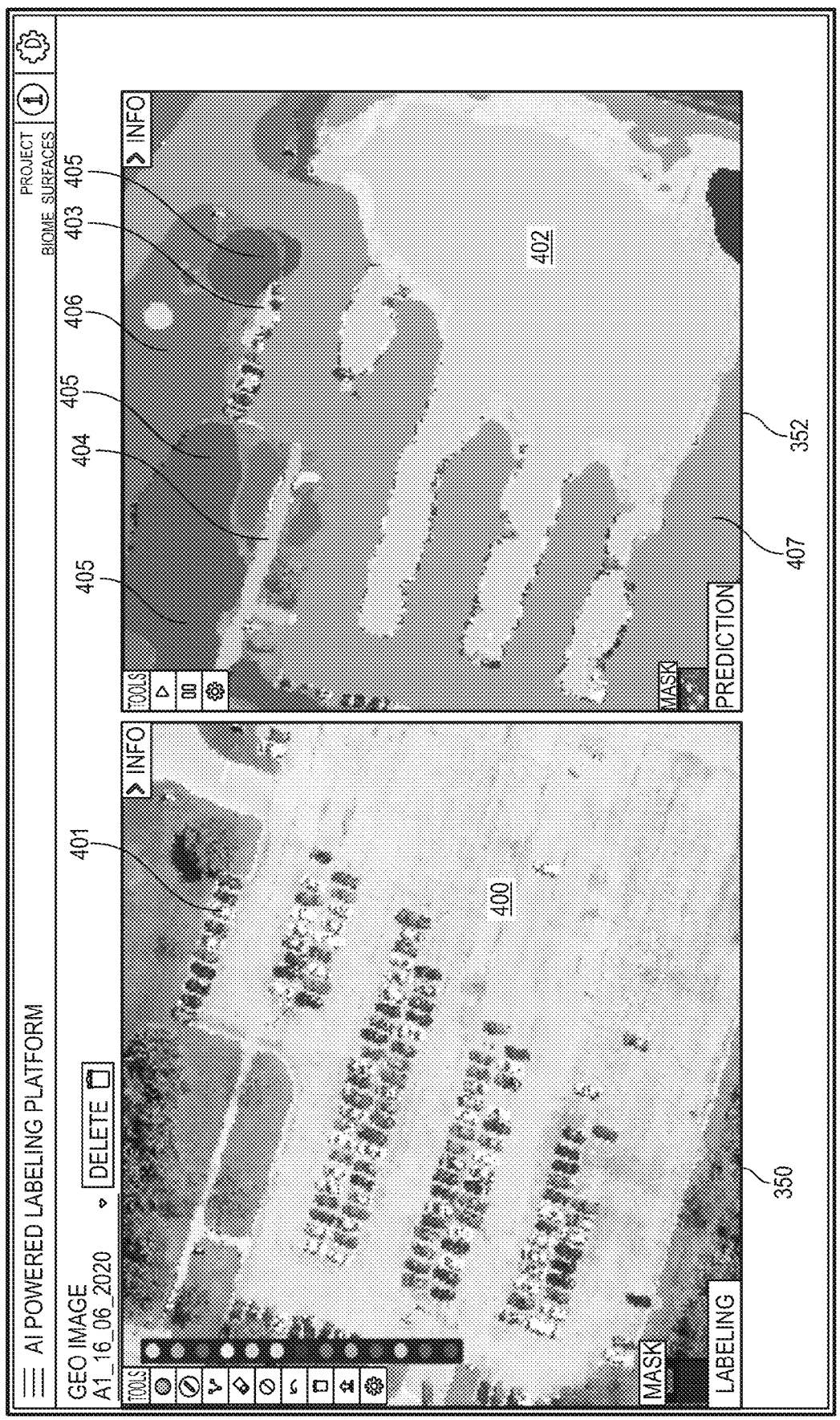
FIG. 13 illustrates the live-labeling interface and how certain background features may be ignored.

FIG. 13 illustrates the live-labeling interface and how certain background features may be ignored. Window 350 shows a parking lot with cars 401. In this example, the task is to label roads, vegetation, buildings, etc., but not cars. Thus, if certain features of the image should be ignored by the model (typically because they appear temporarily in an image or because the features are not critical) the operator may then annotate those features as being background. E.g., when the task is to identify ships in a harbor, all other features of a harbor can be labeled as background since there are not critical for the task to detect ships. In general, use of labeling "background" features is used to focus on a specific class and to reduce complexity for a certain training task. In another example, automobiles may be labeled as background when the goal is only to label roads and other features; the back-end system will then ignore automobiles that appear on the roads and will not try to identify them. All features labeled as background can be split up, identified and refined at a later stage.

The global model itself may also label background features. As shown in the labeling window 350, the cars appear in the lot. In this example, the global model is applied to the newly selected area of the project before there are any annotations made by the operator. Therefore, there are results on the prediction side in window 352 without any annotations being made on the labeling side by the operator. As shown, the global model has been applied and produces window 352 in which the cars (and a portion of the lot) are now labeled in pink 402, 403, i.e., as being background that can be ignored. Later, after more iterations, FIG. 15 shows the lot 434 now being labeled more accurately (cars in pink, lot in light brown).

Once the operator initiates the machine learning model the prediction window 352 then shows the results of that annotation. As shown, regions 402 and 403 appear in pink, meaning that those features should be ignored. Additionally, other features of the image now appear labeled in color as the result of annotations added in window 350 elsewhere within the image: area 404 appears in yellow indicating a walkway; areas 405 appear in green indicating vegetation; areas 406 appear in light green indicating bare ground; and areas 407 appear in gray indicating asphalt pavement.

Figure 14:
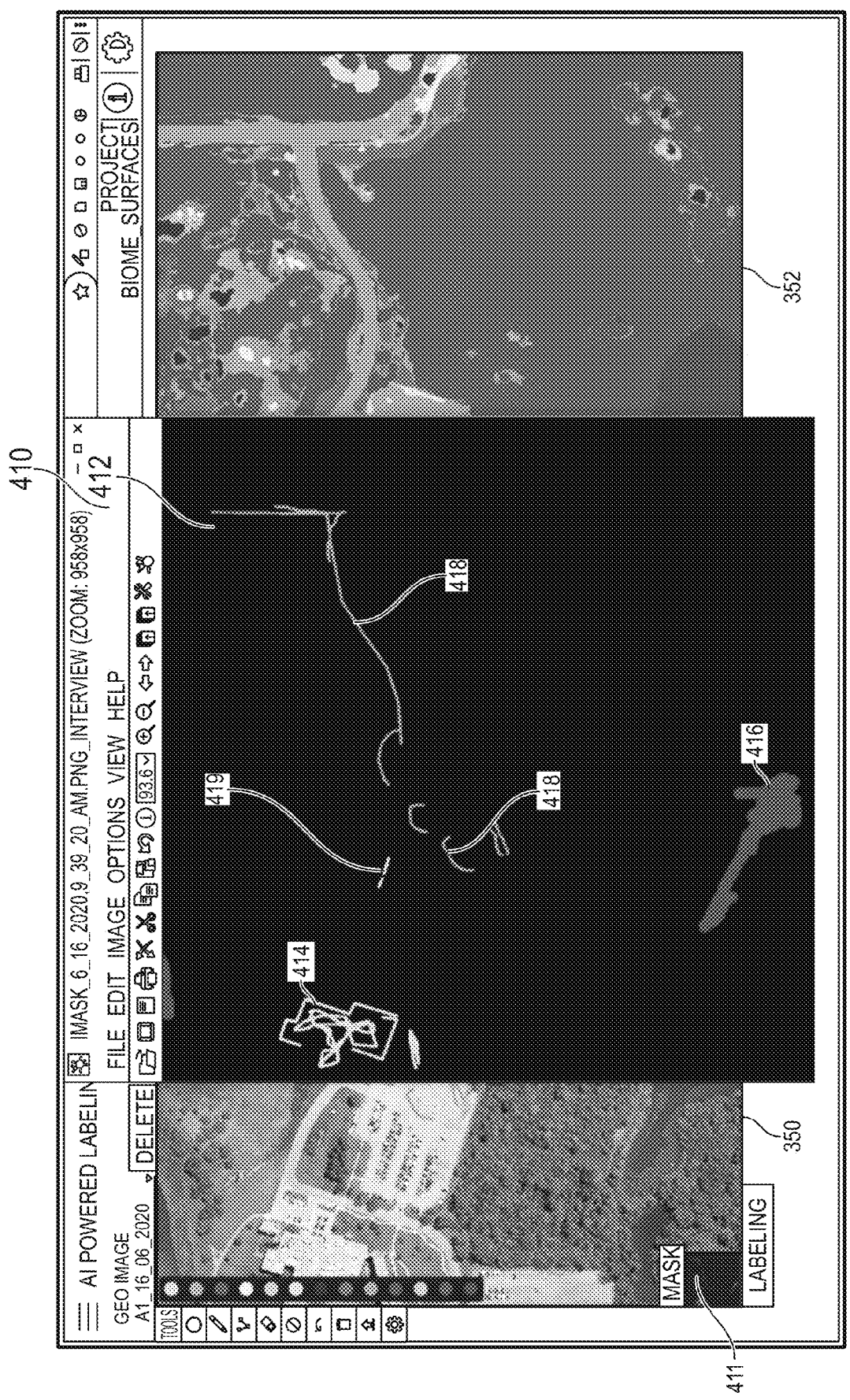
FIG. 14 illustrates the live-labeling interface and how the labeling mask may be exported.

FIG. 14 illustrates the live-labeling interface and how the labeling mask may be exported. The labeling mask is the collection of annotations made by the operator separate from image 334a upon which the annotations are made. As shown, a thumbnail image of the labeling mask 411 is shown as a reference to the operator in the lower left-hand corner of window 350. In order to export the labeling mask including the annotations that the operator has made upon the image, he or she chooses a button of window 350 which then opens window 410 shown here as being superimposed over the interface. As shown, labeling mask 412 includes annotations that the operator has made upon the image including: blue strokes 416 indicating a body of water; light brown lines 418 indicating asphalt roads and parking lots; pink strokes 414 and 419 indicating features to be ignored (a particular building, cars, etc.).

Typically, the labeling mask is exported for optional post-polishing. Thus, exporting is used for cleaning up labels (i.e., import into an editing tool) and then reloading the labeling mask with the cleaned-up labels into the live labeling tool. In addition, if there is a need to download a prediction mask, a PNG can be created in the back-end system. The labeling mask may be exported from the front-end system where it is stored in persistent storage, or, it may be exported from the back-end system where it also may be stored in persistent storage after having been sent via 244 from the front-end system.

FIG. 15 illustrates the live-labeling interface and how the prediction mask may be exported as well. The prediction mask is a collection of colored labels generated automatically by the back-end system that normally appears in window 352 over the image. As shown, a thumbnail image of the prediction mask 422 is shown as a reference to the operator in the lower left-hand corner of window 352. In order to export the prediction mask the operator chooses a button of window 352 which then opens window 424 shown here as being superimposed over the interface. As shown, prediction mask 426 includes, for example, blue areas 430, green areas 432, gray areas 434, pink areas 436, and red areas 438. Also included are any number of black areas 439 indicating that no prediction has been given by the machine language model. As shown, there are numerous black areas in the exported prediction mask, mostly in the top third of the mask. The exported mask can be used for further analysis or for later post-processing like vectorization. In addition, if the prediction mask is quite accurate as determined by the operator, the prediction mask may be swapped for the labeling mask. In other words, the prediction mask may be used as the labeling mask. This may be accomplished by downloading the prediction mask from the back-end system to the front-end system and then using a command in the front-end system to replace the labeling mask with the prediction mask.

FIG. 16 illustrates the live-labeling interface and the effectiveness of system 200 in using sparse labels. Sparse labels and the annotations used in labeling window 350 result in precise and accurate labels in prediction window 352 showing the resultant prediction mask (including suburban areas, vegetation, water bodies, earth ground, etc.).

For example, as shown in labeling window 350, bodies of water 446 and 448 have been annotated in blue, resulting not only in those features being labeled as water in prediction window 352, but also features 466, 468, 469 being labeled correctly (in blue) as bodies of water by system 200. Light blue 467 is a small pool. Further, merely by annotating feature 440 in green in the labeling window, the system is then able to automatically label features 460 and 461 correctly as vegetation (in green) in prediction window 352. Also, note that the operator has annotated features 442 in 444 in red (bare ground), thus causing the system to automatically and correctly label features 464 (among others) as also being bare ground (red). Similarly, annotations in light brown have been used on the roads in regions 452, 453 resulting in the entire road areas 473 and 475 also being labeled correctly as roads (in light brown). The color pink has been used upon the five houses shown at 454 indicating houses, and the system has then correctly labeled all houses in the prediction window 352 as being in pink, 474 for example. Light green has been used in area 456 to indicate yards of houses, and the system has correctly labeled in prediction window 352 many more regions (476 for example) as being yards of houses (in light green). Yellow has been used as an annotation along regions 458 to indicate a feature that should be labeled as a sidewalk or a hard surface. Accordingly, the system in prediction window 352 has labeled all regions 478 as being the sidewalks of the community (in yellow).

In general, it has been found that having at least about twenty annotated images in a project (which is a mosaic of aerial images) yields useable results in a prediction mask and the resultant labeling masks. Optimal outcomes are delivered when there are about eighty annotated images (for various classes) that feed into the global model of one project. These outcomes, of course, depend upon the detection and prediction task at hand and how many classes are involved.

Using another metric, whereas the prior art requires that 100% of the features in an image be labeled in order to produce a suitable labeled image for training, the present invention produces a suitable labeled image for training with less than 100% of the features labeled in that image. And in another metric, it is found that only labeling less than about 5% of the area of all features in an image yields a labeling mask suitable for training. Further, it is found that only labeling less than about 50% of the area of all features in an image yields a labeling mask that is better suitable for training. And, it is further found that only labeling less than about 80% of the area of all features in an image yields a labeling mask that is preferable for training.

Screenshots Showing a Second Exemplary Workflow and Use of Tools

Figure 17:
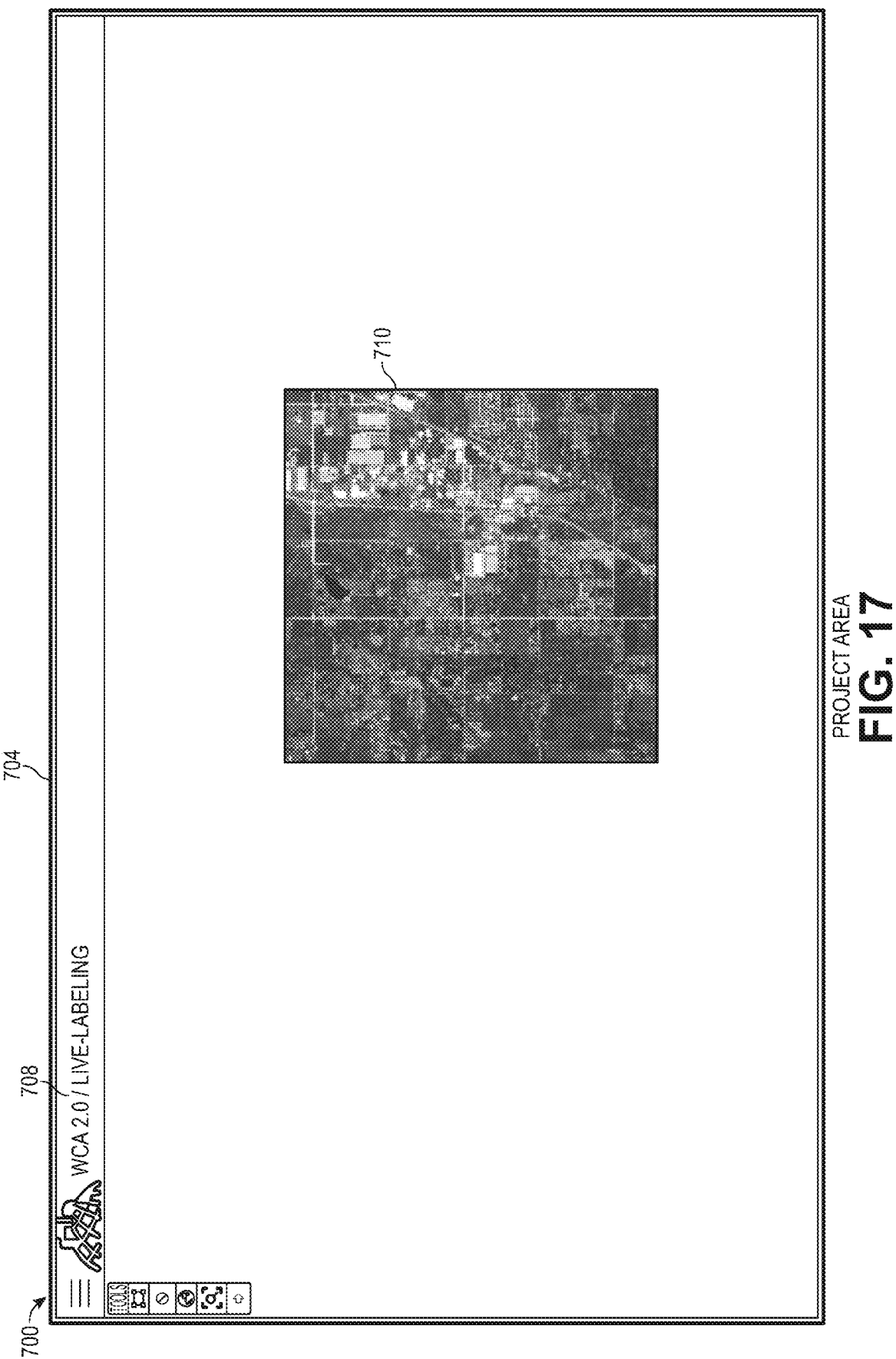
FIG. 17 illustrates a project area of geographic images viewed within a front-end system.

FIG. 17 illustrates a project area of geographic images 700 viewed within a front-end system 180. Shown is a window 704 of computer 130 executing within a live labeling software tool having a name as shown at 708. A batch of geographic images 710 is shown within the window. The operator will have the ability to create a particular area of interest in order to perform labeling on an image.

Figure 18:
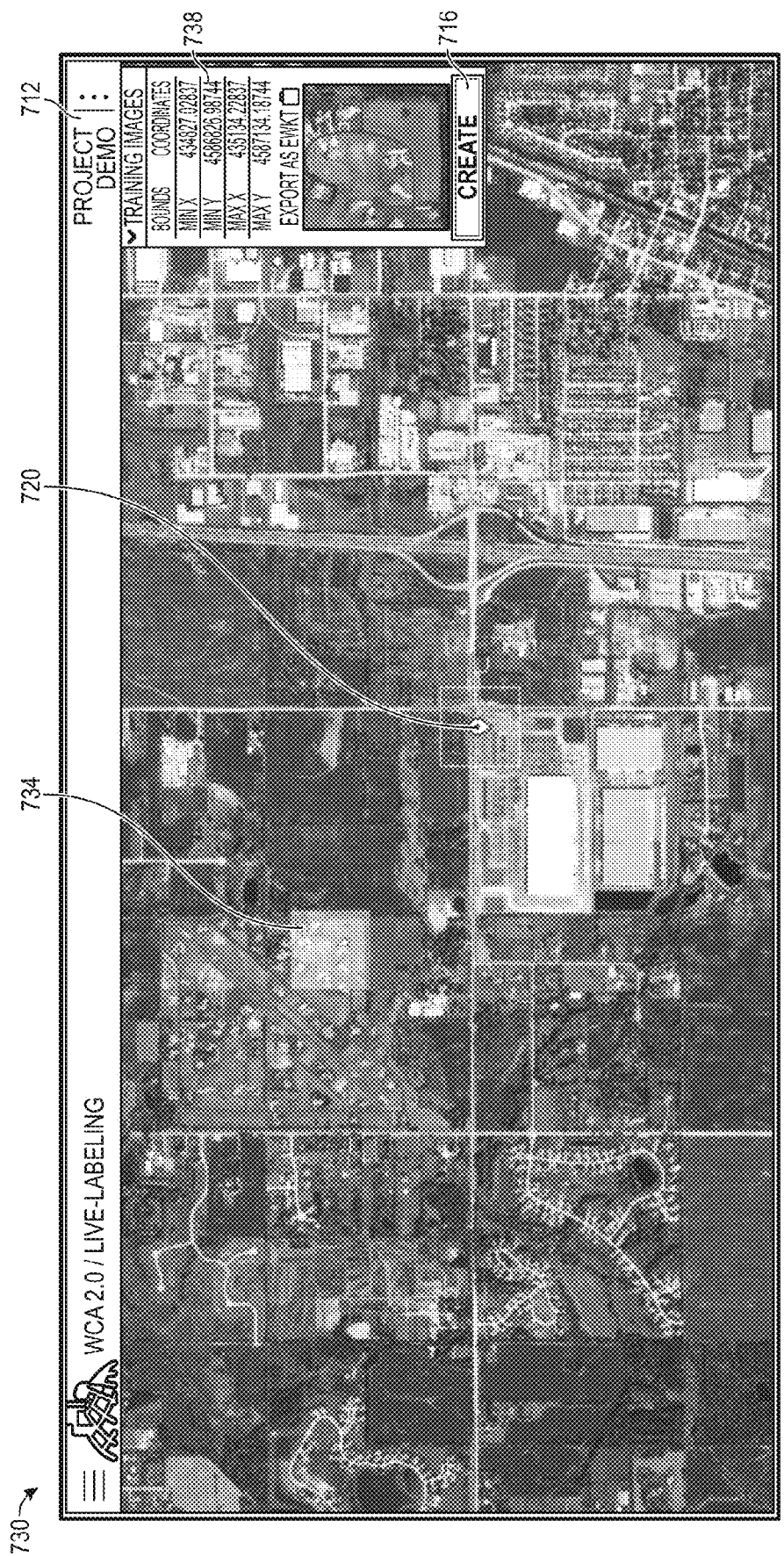
FIG. 18 illustrates a selected area of interest within the project area.

FIG. 18 illustrates a selected area of interest within the project area 700. Shown is the selected area of interest 734, a control panel 738 used to define that area 734, and a command 716 used to select that area and save it as a file to be labeled in the live-labeling interface. Once selected, the area is named, e.g., "demol", stored as a file, and is ready to be used in the live-labeling interface. Marker 720 indicates another area of interest for labeling that has already been selected and stored.

Figure 19:
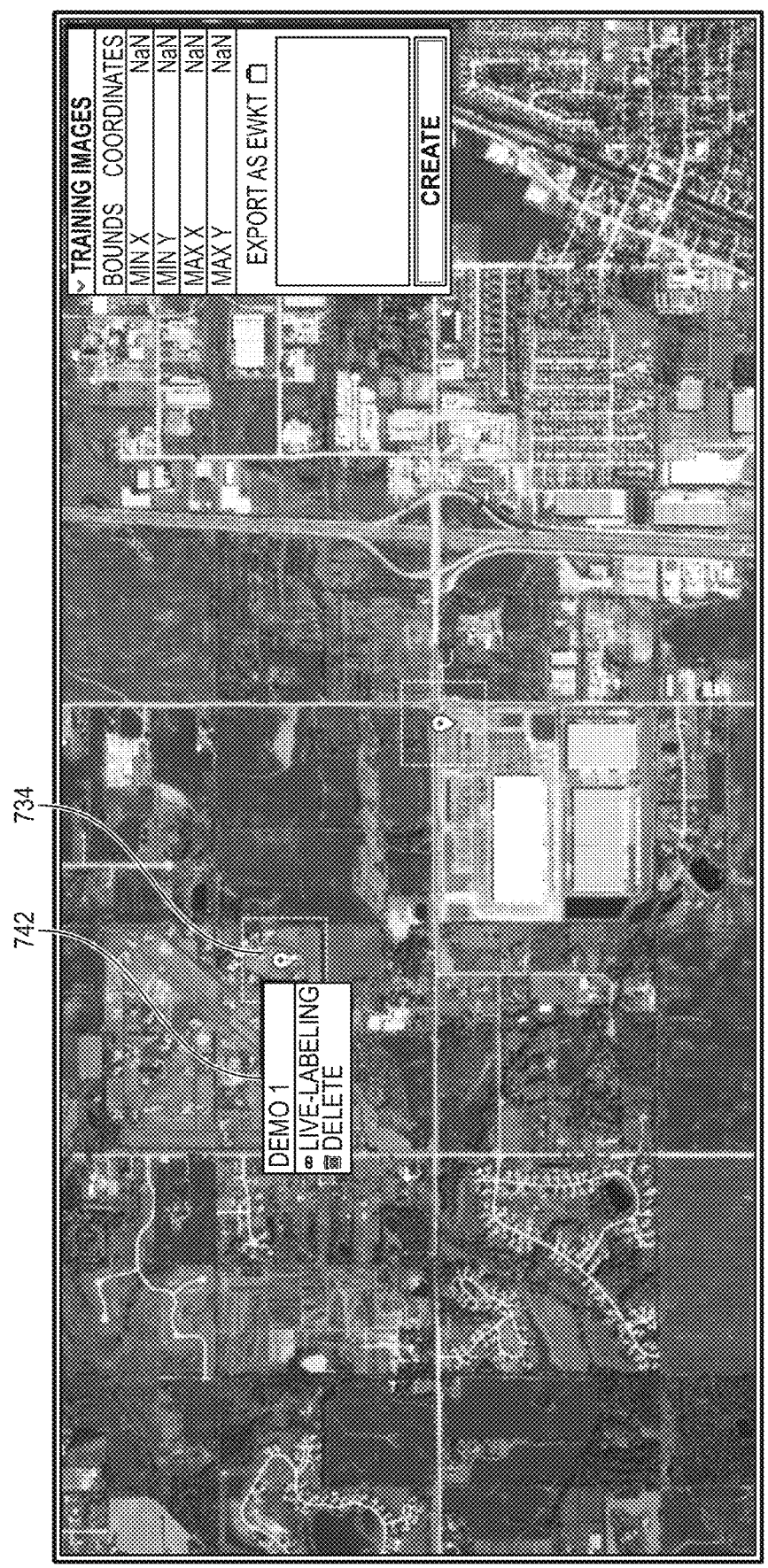
FIG. 19 illustrates the selected area of interest within the project area.

FIG. 19 illustrates the selected area of interest within the project area 700. As shown, in response to hovering the mouse over area 734 window 742 appears that has the options of "delete" the area or select "Live Labeling" in order to initiate the live labeling software tool and to load area 734 into that tool. Typically, a project will have many areas of interest within a project area; shown are two within FIG. 19.

Figure 20:
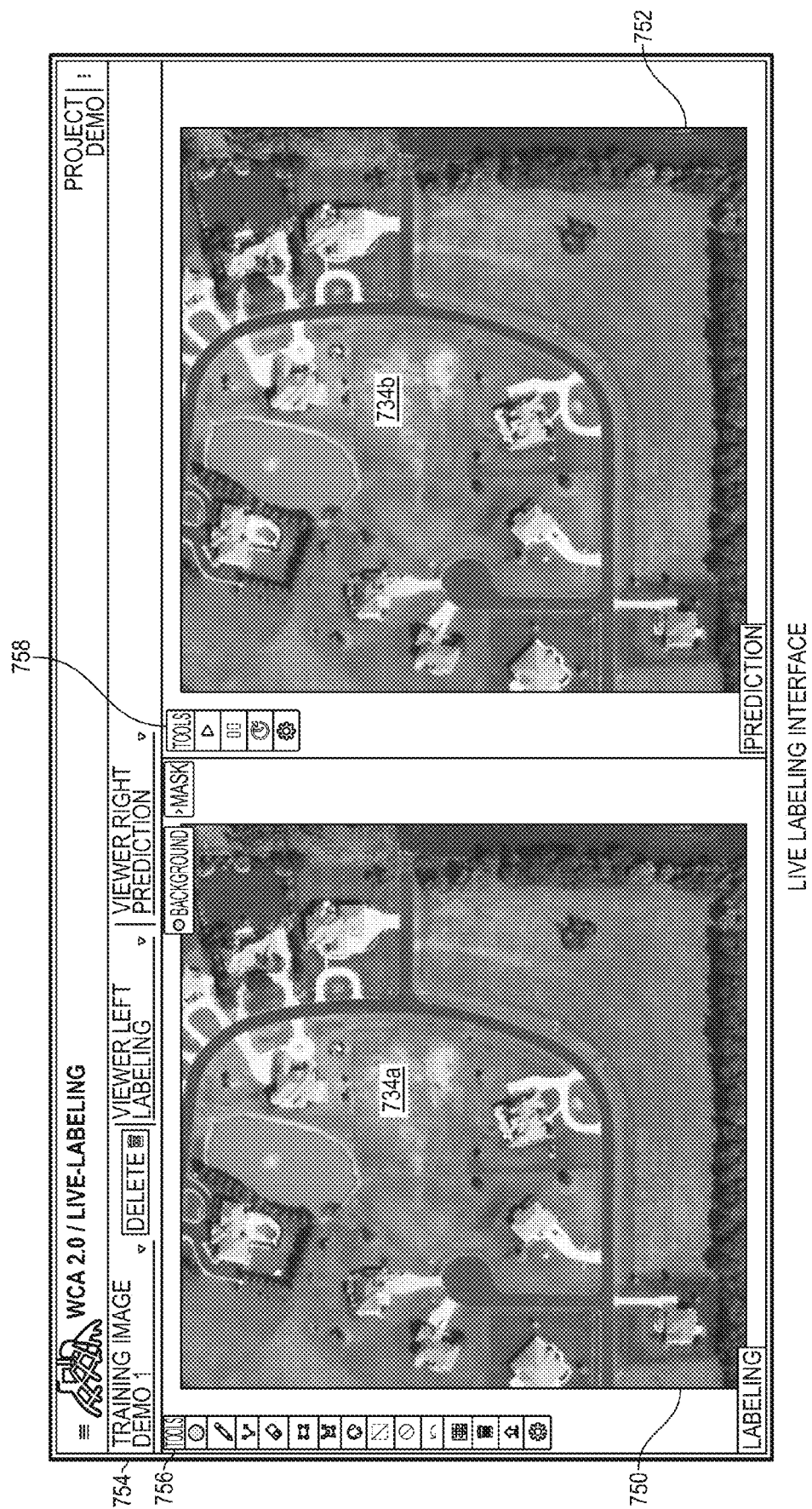
FIG. 20 illustrates the live-labeling interface of the labeling tool.

FIG. 20 illustrates the live-labeling interface of the labeling tool. Once opened, a file is opened in order to store the area of interest; the file is then loaded into the live-labeling interface. Alternatively, the area is stored in the file when first selected in FIG. 18. As shown, the live-labeling interface includes a window 750 on the left-hand side (the labeling window) and a window 752 on the right-hand side (the prediction window). Window 750 includes an image of the selected area of interest 734a that will be labeled by the operator, and window 752 includes the same image 734b that will show the automatically-generated labels from the back-end system 140 (that will be made on the basis of the annotations from the operator once the operator clicks the play button within tools 758). Shown is a file name at 754 and various tools available 756. In this example, the operator does not click the play button and thus image 734b will not change during this example, although the labeling mask created will be exported. Typically, the labeling mask will have only those annotations added by the operator in the labeling window, but, it may include annotations added by the global model after producing the prediction mask if the operator decides to swap the labeling mask for the prediction mask. In that case, the labeling mask will be the prediction mask. The operator may decide to substitute the prediction mask for the labeling mask by executing a command on the user interface of the live labeling tool. If so, the labeling mask overlay stored in persistent storage of the front-end system is replaced by the prediction mask overlay.

Figure 21:
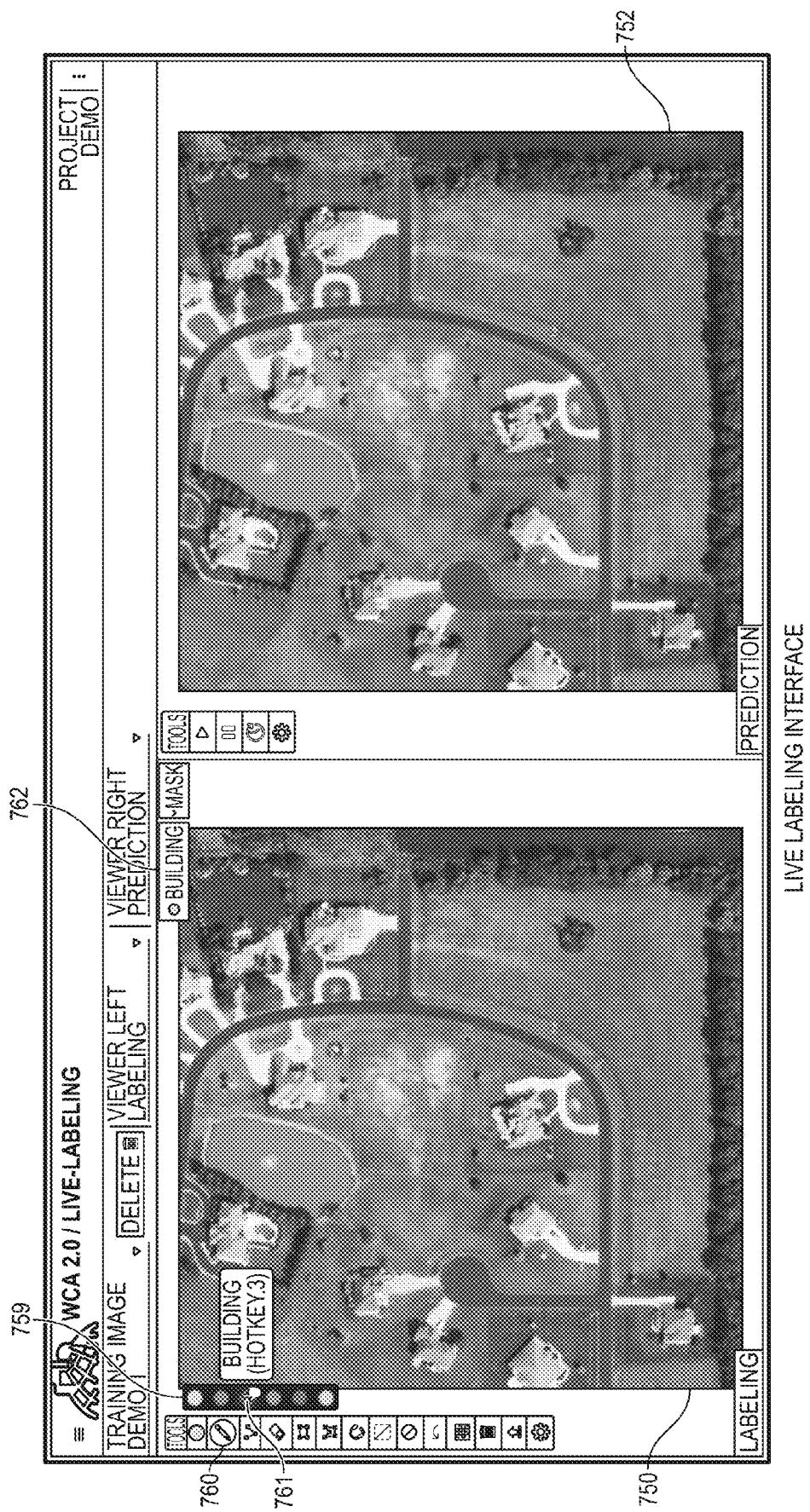
FIG. 21 illustrates the live-labeling interface of the labeling tool in which a class is chosen.

FIG. 21 illustrates the live-labeling interface of the labeling tool in which a class is chosen. As shown, a color palette tool 759 is available and the operator has chosen pencil tool 760 and is about to select the color red 761 which corresponds to the class of "buildings." Window 762 shows the current class and color that is in use, namely red and "building."

Figure 22:
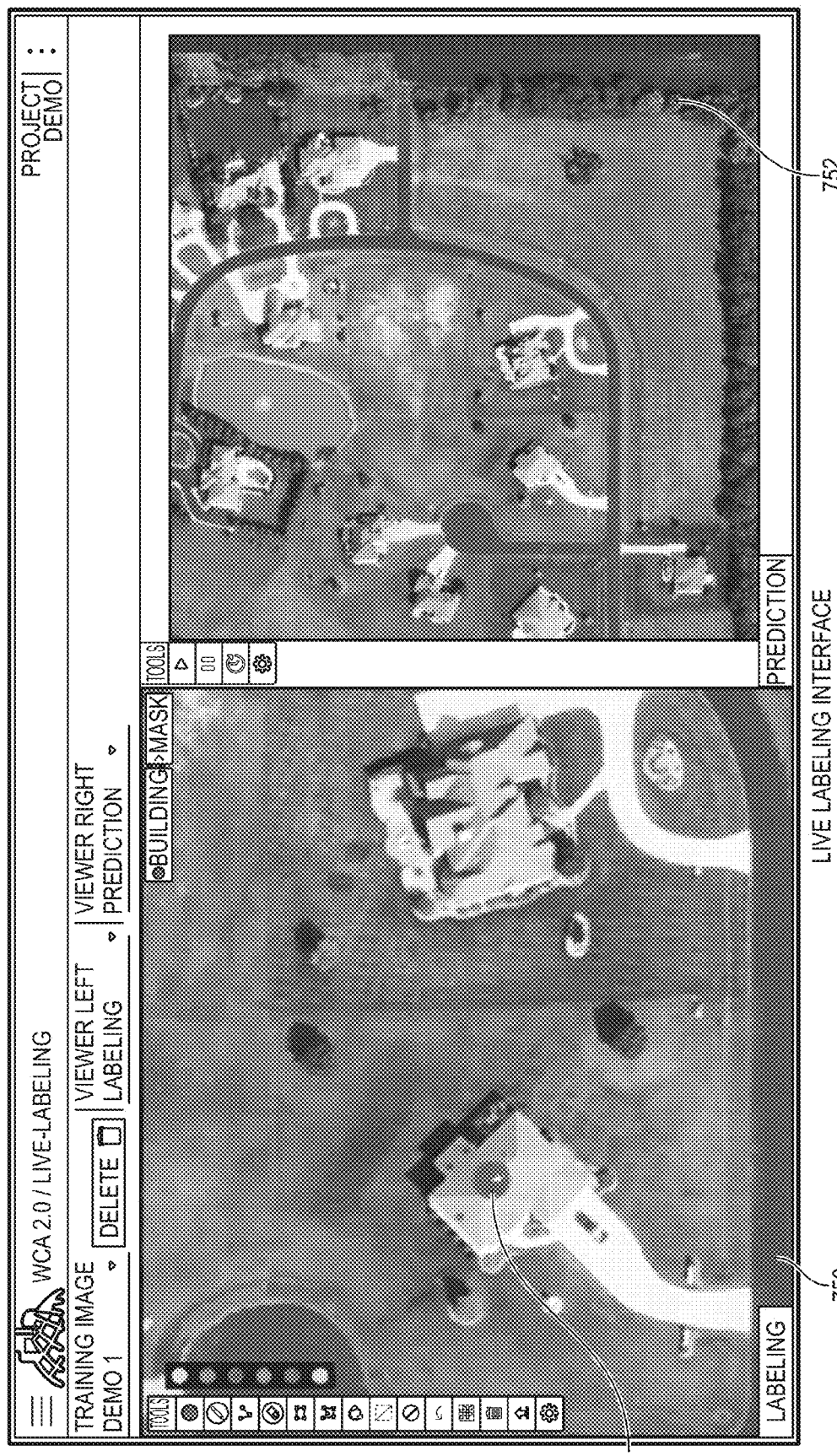
FIG. 22 illustrates the live-labeling interface of the labeling tool in which a house is annotated.

FIG. 22 illustrates the live-labeling interface of the labeling tool in which a house is annotated. The pencil tool has an adaptable brush size and the operator has zoomed in and has marked house 764 in red as a "building."

Figure 23:
FIG. 23 illustrates the live-labeling interface of the labeling tool in which a tool and opacity are adjusted.

FIG. 23 illustrates the live-labeling interface of the labeling tool in which a tool and opacity are adjusted. The operator has opened a Labeling Settings window 766 in which the stroke size of the tool (e.g., pencil) or opacity of the labels may be adjusted. A lower opacity (i.e., more transparent) allows the aerial image to show through the labels. This opacity setting may be adjusted for either the labels in the labeling window, in the prediction window or in both.

Figure 24:
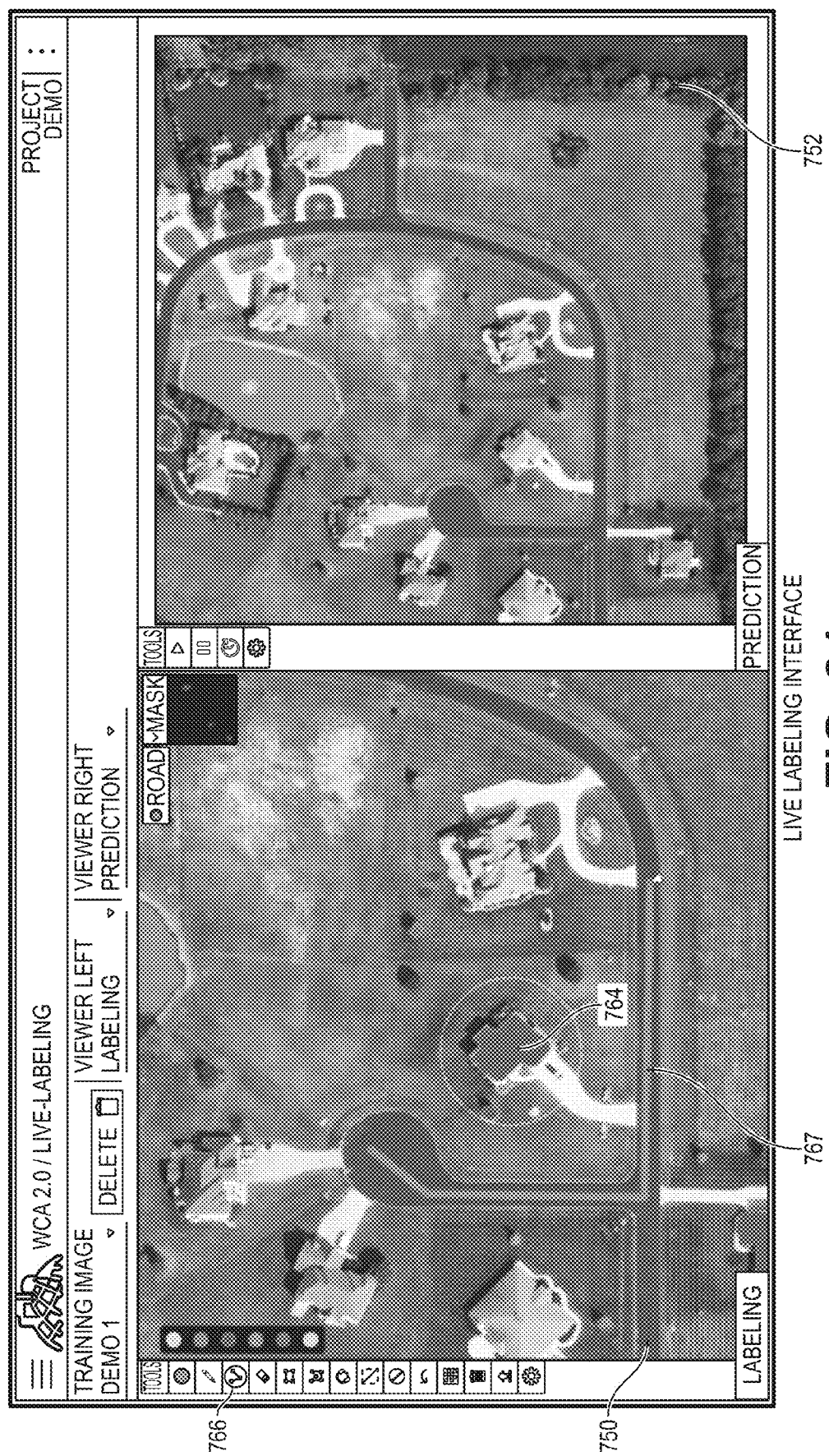
FIG. 24 illustrates the live-labeling interface of the labeling tool in which a line tool is used.

FIG. 24 illustrates the live-labeling interface of the labeling tool in which a line tool is used. Line tool 766 is selected and the operator has chosen the color blue "road" in order to add line 767 as an annotation in order to label roads. Note that a small bush to the left of house 764 has been incorrectly labeled in red.

Figure 25:
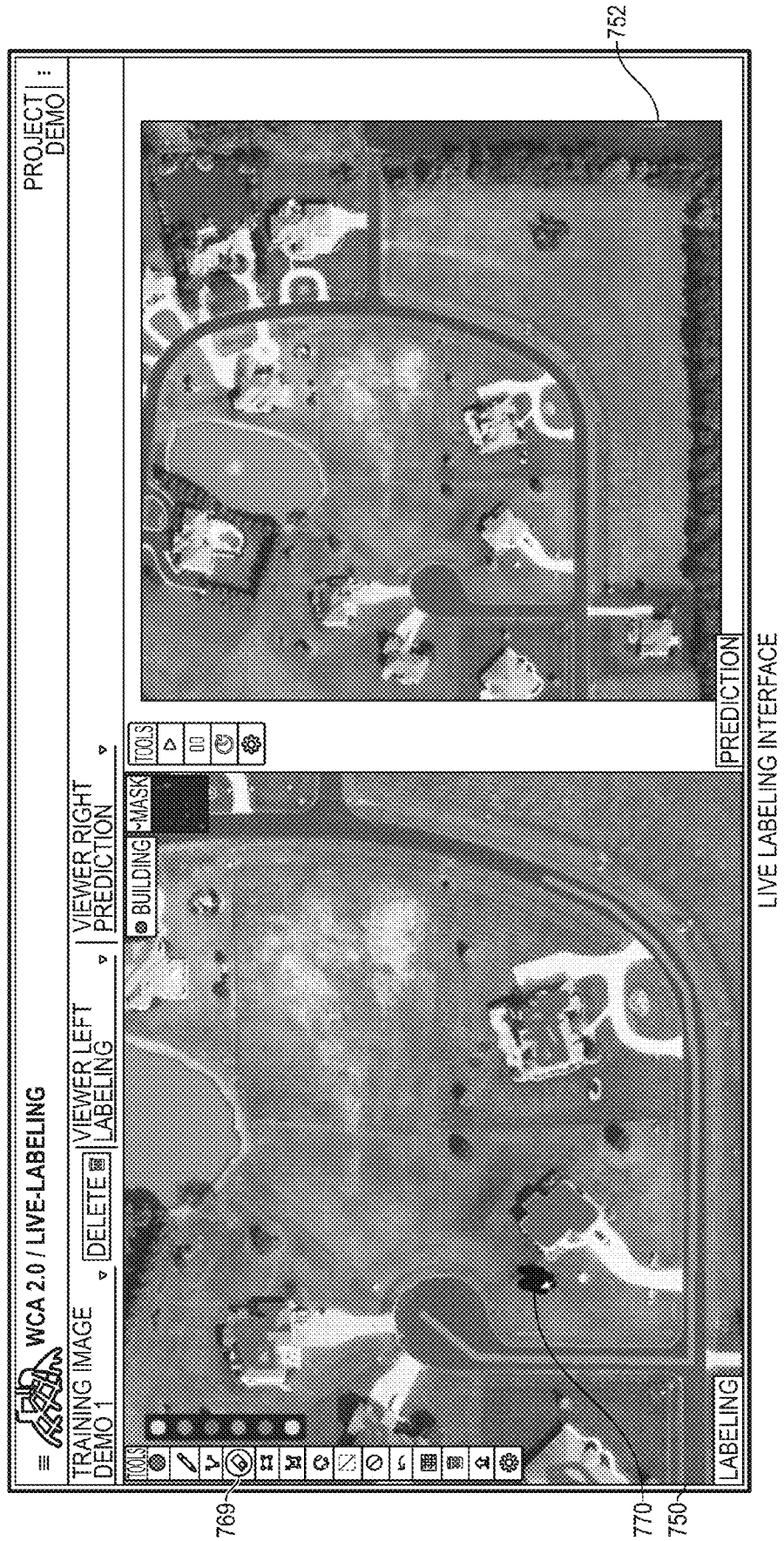
FIG. 25 illustrates the live-labeling interface of the labeling tool in which an eraser tool is used.

FIG. 25 illustrates the live-labeling interface of the labeling tool in which an eraser tool is used. Eraser tool 769 is selected and the operator has added annotation 770 in black in order to erase the erroneous red on the bush. When the annotated image is sent to the back end, it will ignore region 770 as if no annotation had been added.

Figure 26:
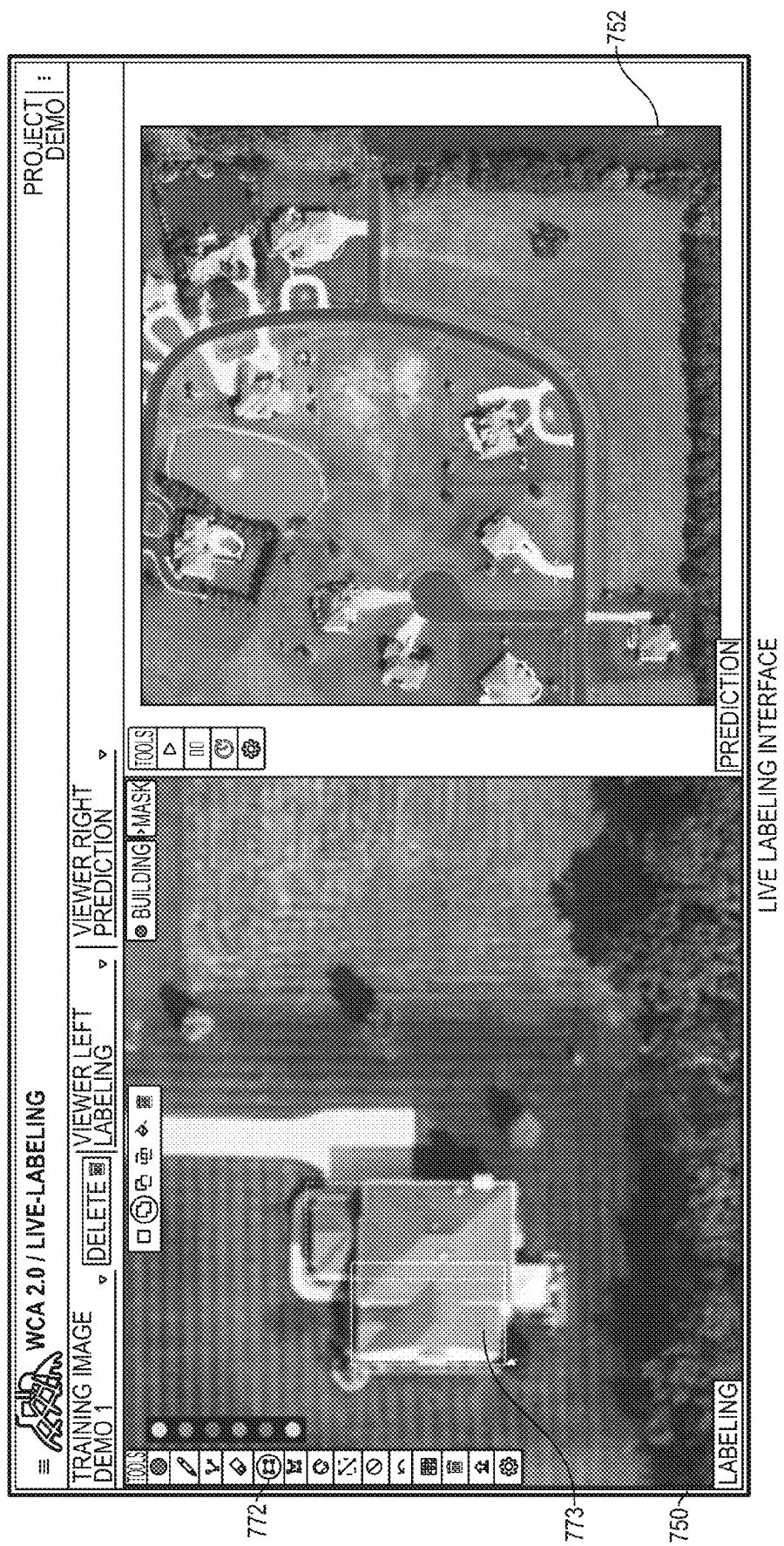
FIG. 26 illustrates the live-labeling interface of the labeling tool in which a square tool is used.

FIG. 26 illustrates the live-labeling interface of the labeling tool in which a square tool is used. The operator has selected square tool 772 which is used to mark a rectangle in an image that can then all be labeled as one class (color). In this example, the house has been labeled with two rectangles 773 which may then be joined into one and labeled.

Figure 27:
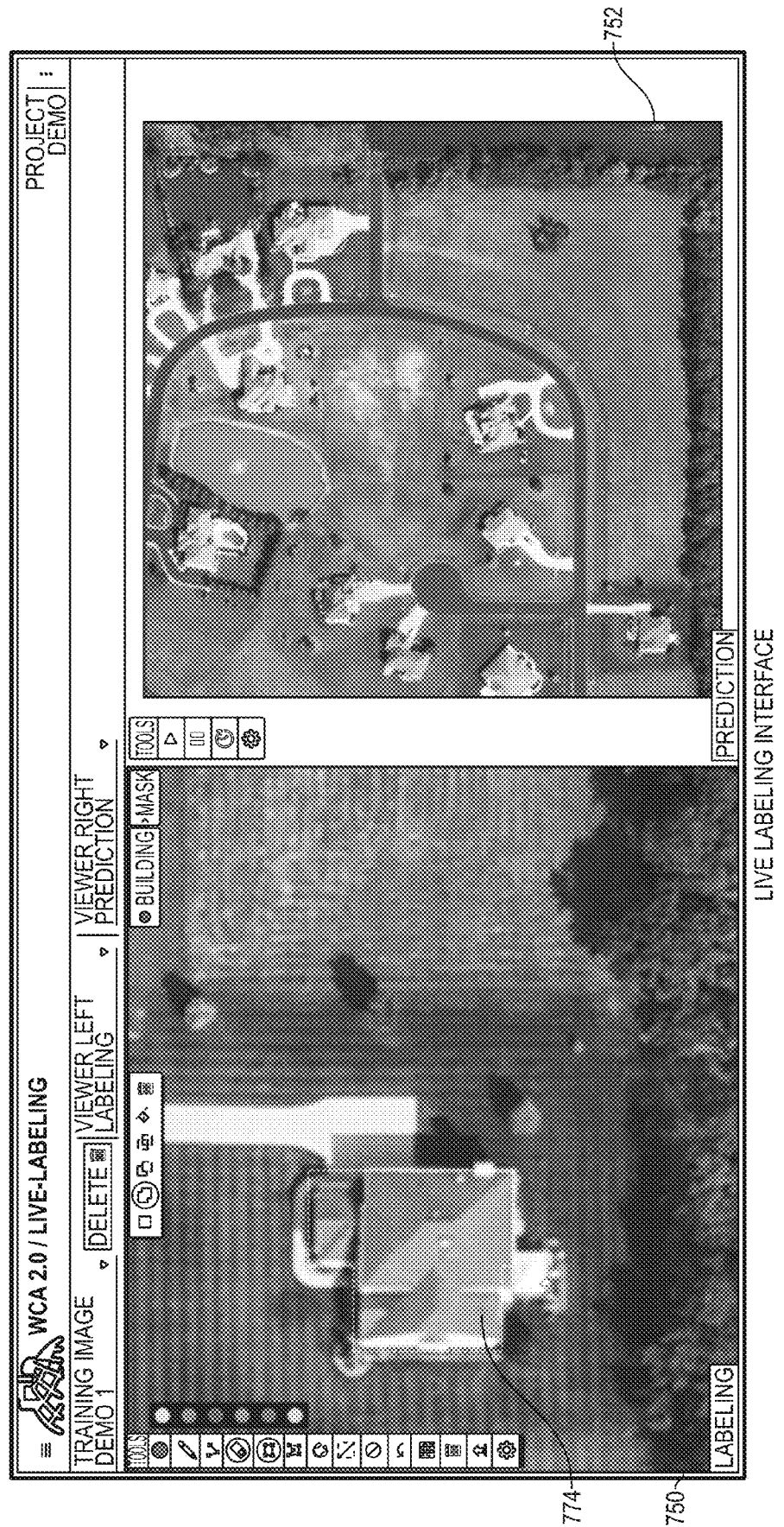
FIG. 27 illustrates the live-labeling interface of the labeling tool in which two squares are joined.

FIG. 27 illustrates the live-labeling interface of the labeling tool in which two squares are joined. As shown, previous two squares 773 have been joined into a single square 774 which may then be labeled in order to annotate the house with a single color or class.

Figure 28:
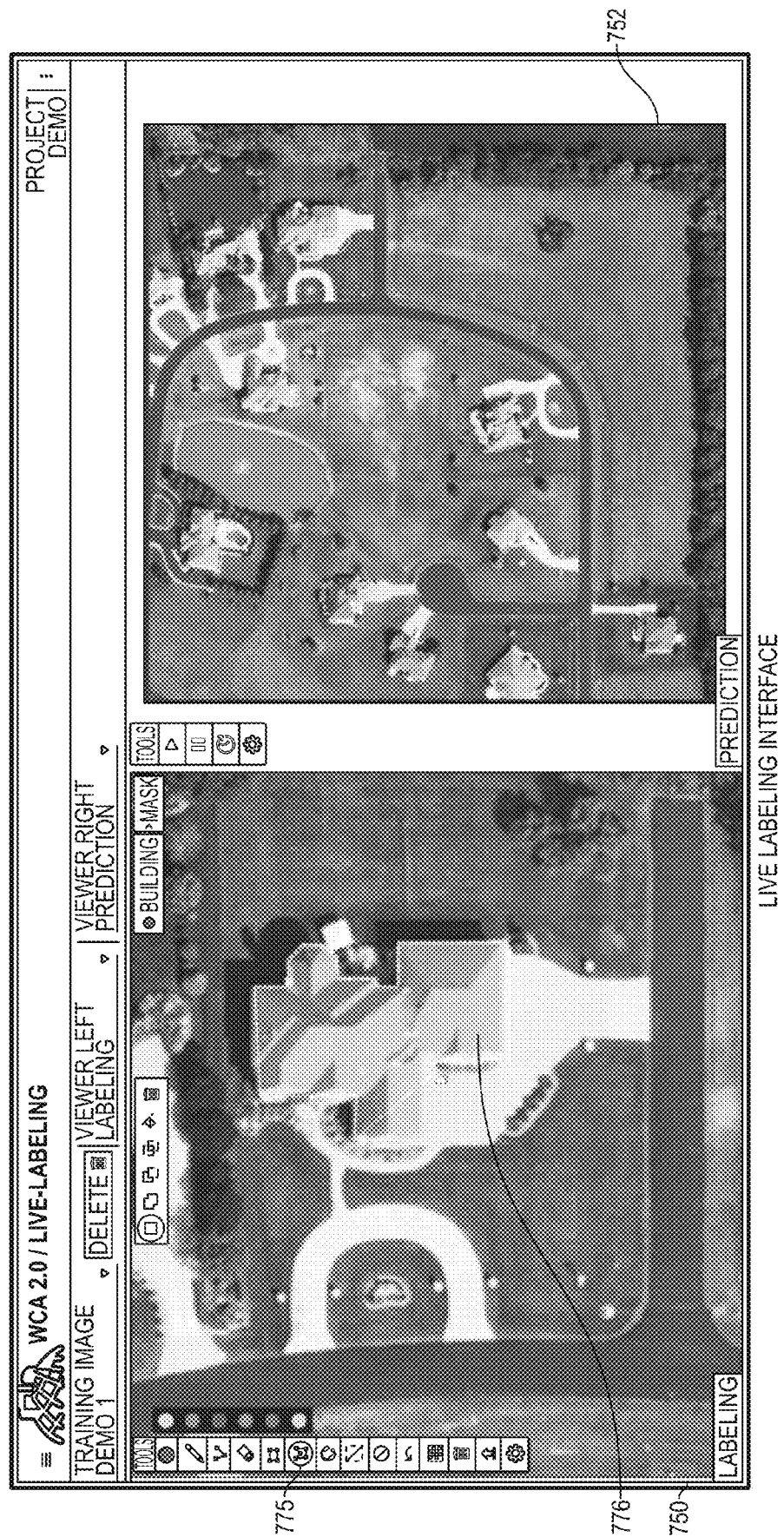
FIG. 28 illustrates the live-labeling interface of the labeling tool in which a polygon tool is used.

FIG. 28 illustrates the live-labeling interface of the labeling tool in which a polygon tool is used. Tool 775 is selected and is used to circumscribe a polygon over an area 776 which in this case is an irregularly-shaped house.

Figure 29:
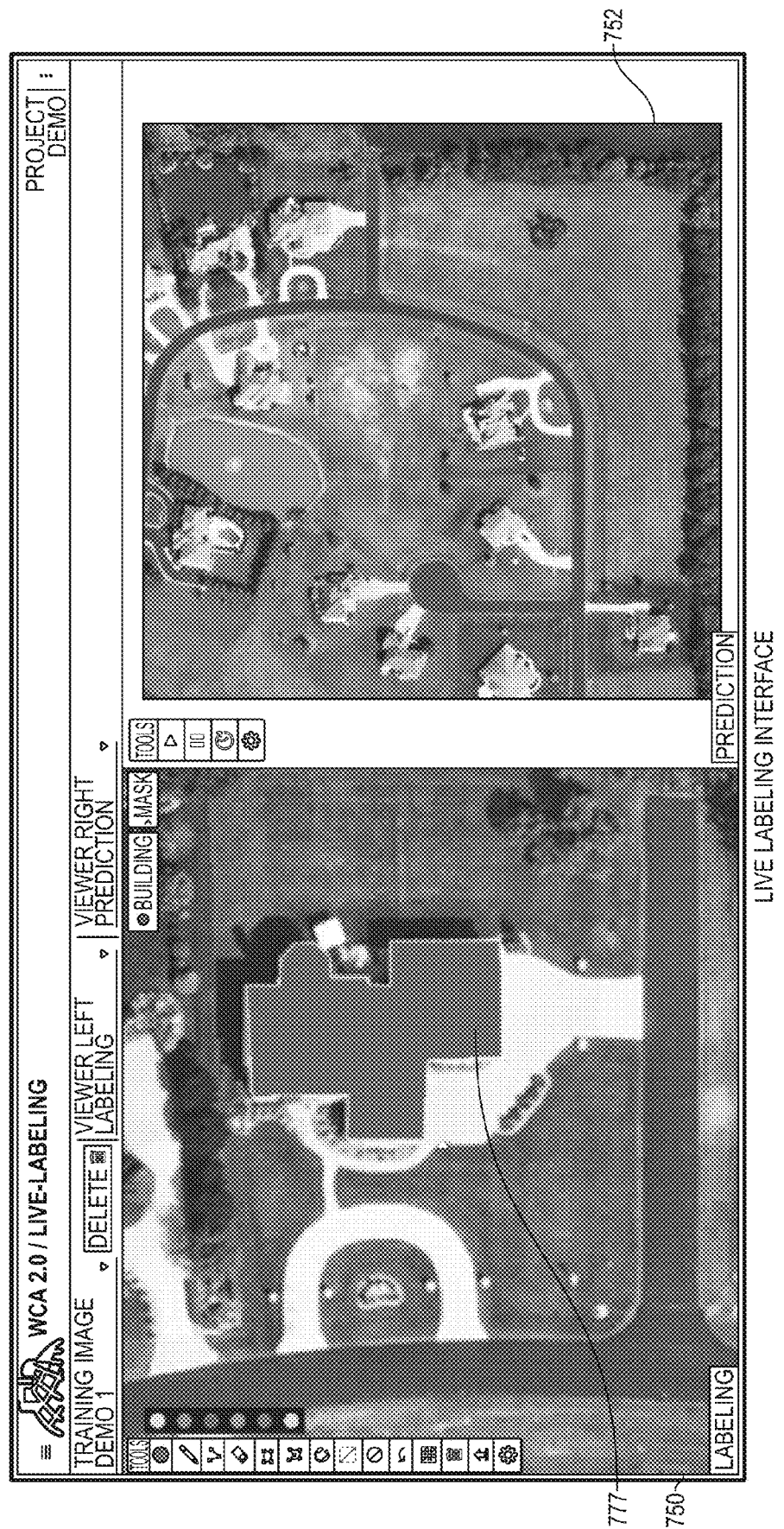
FIG. 29 illustrates the live-labeling interface of the labeling tool in which a polygon is labeled.

FIG. 29 illustrates the live-labeling interface of the labeling tool in which a polygon is labeled. As shown, area 776 has now been labeled 777 in order to annotate the house with a single color or class.

Other tools below the polygon tool include: a circle tool that can be used to draw circles or elliptical shapes in an image for labeling such as the functionality of the square tool; a tool that erases all labels for a marked area (square with slash); a tool/command that sets back all labels in an image; a tool/command that skips one action backward (arrow); a freeze tool that freezes all labeled pixels in an area that is marked; a delete all tool/command shown as a trash can icon; and an export tool/command that causes the current labeling mask of window 750 to exported and saved in a particular file format in computer storage, or to be uploaded as a file to a computer server which may be remote.

Figure 30:
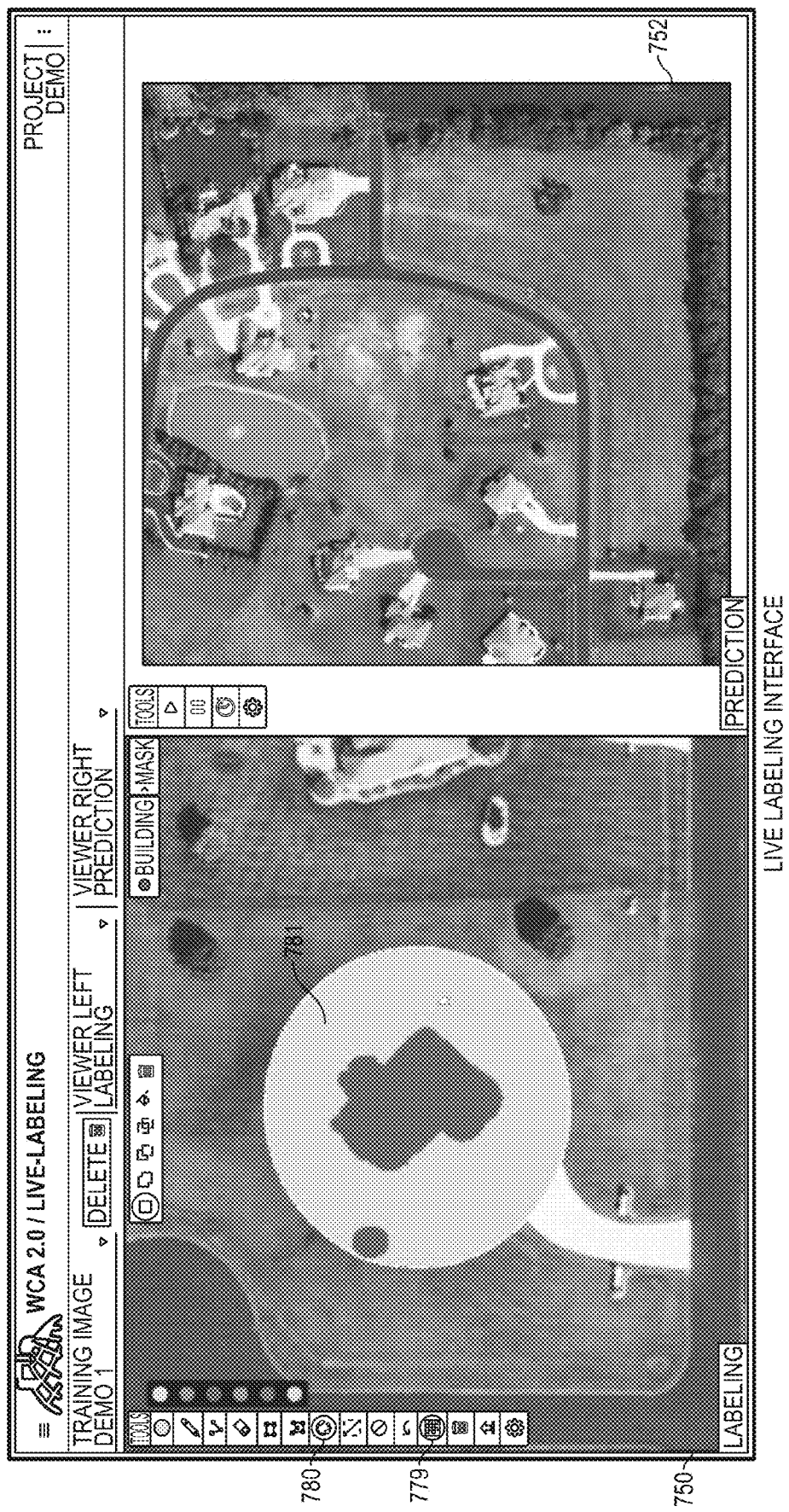
FIG. 30 illustrates the live-labeling interface of the labeling tool in which the freeze tool is used.

FIG. 30 illustrates the live-labeling interface of the labeling tool in which the freeze tool is used. As shown, the freeze tool 779 has been selected, then the circle tool 780 is used to draw a circle 781 around two objects labeled as buildings (circle shown earlier in FIG. 24). The freeze command/tool 779 keeps the previously-labeled red areas intact as red and fills in the remaining area as pink, or "background."

Figure 31:
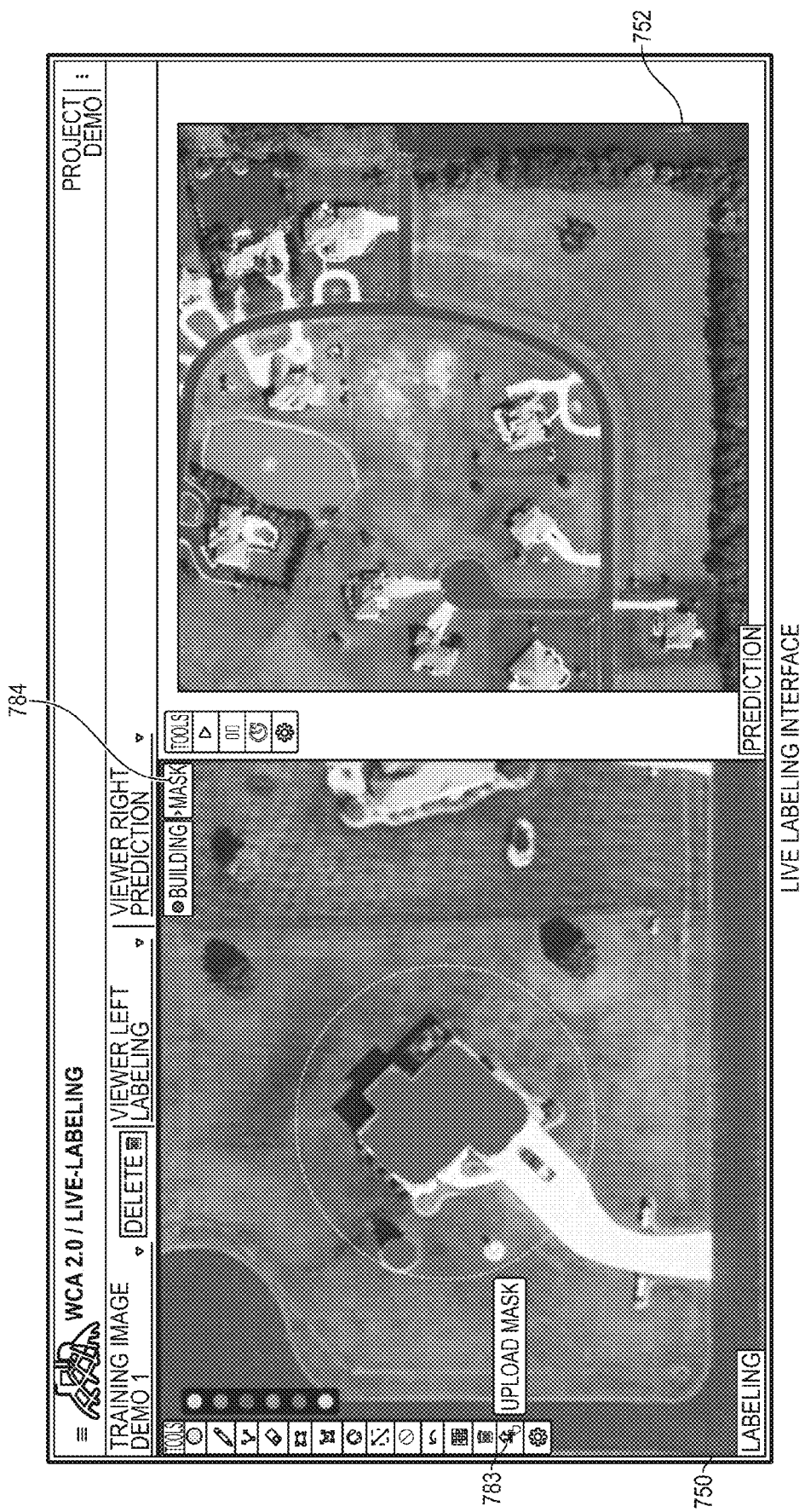
FIG. 31 illustrates the live-labeling interface of the labeling tool in which the upload mask tool/command is used.

FIG. 31 illustrates the live-labeling interface of the labeling tool in which the upload mask tool/command 783 is used. As shown the tool is selected at 783. Optionally, the operator may select 784 in order to view the mask as a small thumbnail image in the top-right corner.

Figure 32:
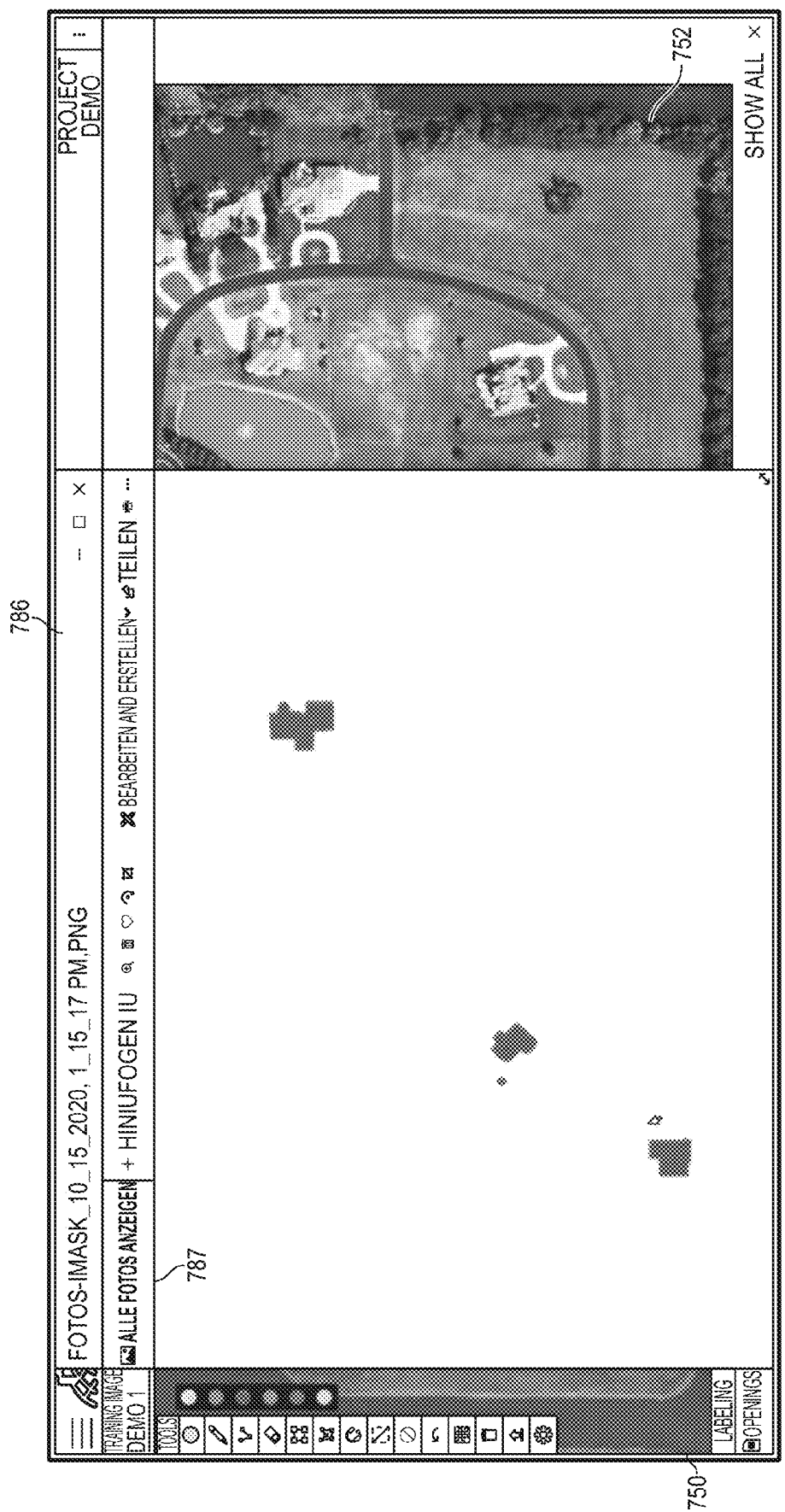
FIG. 32 illustrates the live-labeling interface of the labeling tool in which labeling mask is exported.

FIG. 32 illustrates the live-labeling interface of the labeling tool in which labeling mask is exported. Once command 783 is selected, window 786 appears showing the labeling mask which may then be saved as a file in the PNG format (or in any other suitable format) to the local computer or to a remote computer. Shown is a file name 787. In this example, only various building had been marked in red. Typically, the exported labeling mask will show only what the operator had annotated, but, if the operator decides to substitute the prediction mask for the labeling mask then the exported labeling mask will appear as the prediction mask in the prediction window after many iterations.

Figure 33:
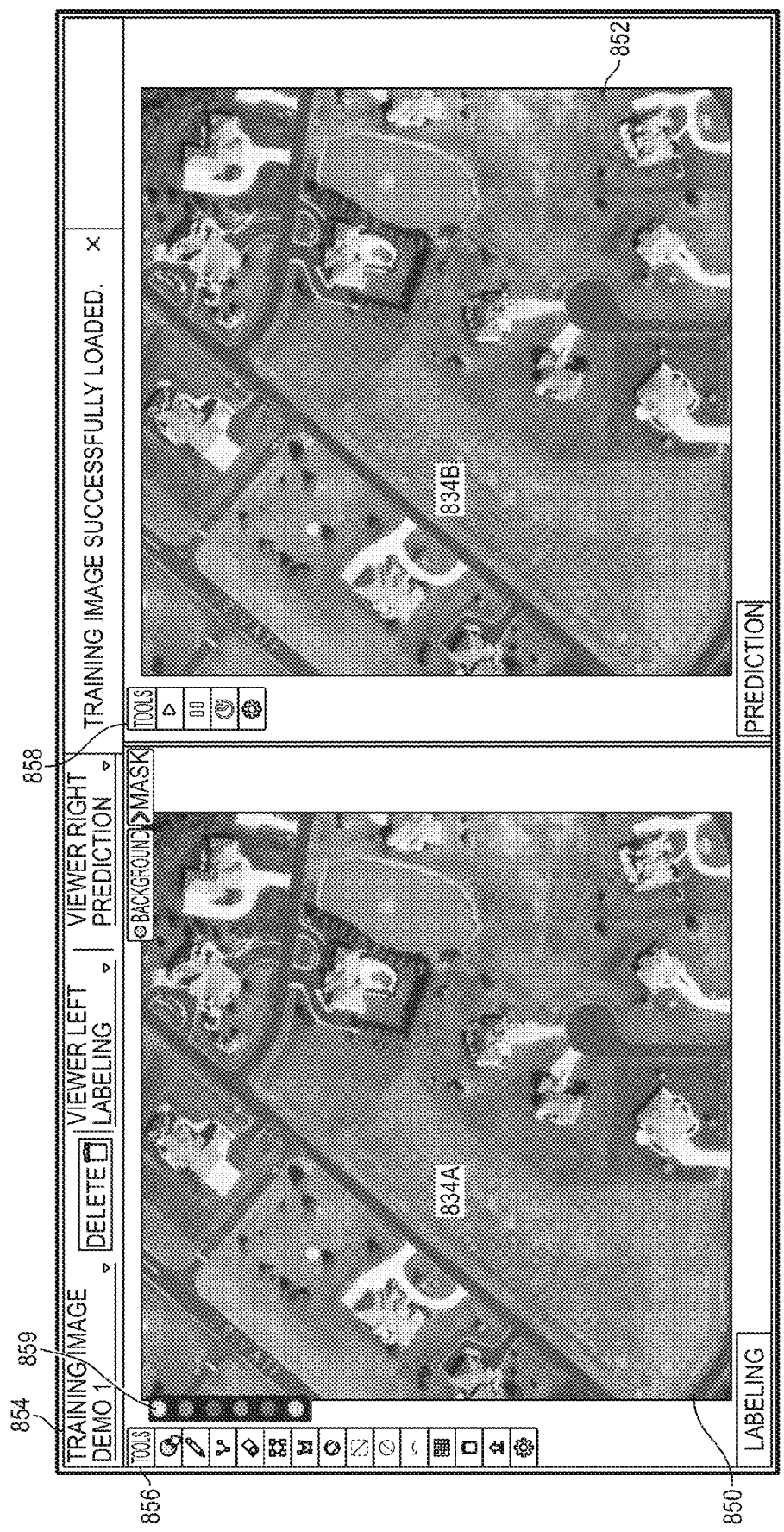
FIG. 33 illustrates the live labeling interface of the software labeling tool showing another area of interest within project.

Screenshots Showing a Third Exemplary Workflow and Visualization of the Prediction Process FIG. 33 illustrates the live labeling interface of the software labeling tool showing another area of interest within project 700. This example will show how the image in the prediction window may change. Shown is a labeling window 850 including an image 834a and a prediction window 852 including an image 834b which is currently the same as the image in the labeling window. The name of the file is shown at 854, tools 856 and color palette 859 are available, as well as tools 858 in the prediction window. As shown, the operator has not yet clicked the play button within tools 858 and thus the prediction process and the visualization of the results has not begun. In this example pink will be used to label the background, blue will be used to label roads, brown will be used to label driveways, and red will be used to label buildings.

Figure 34:
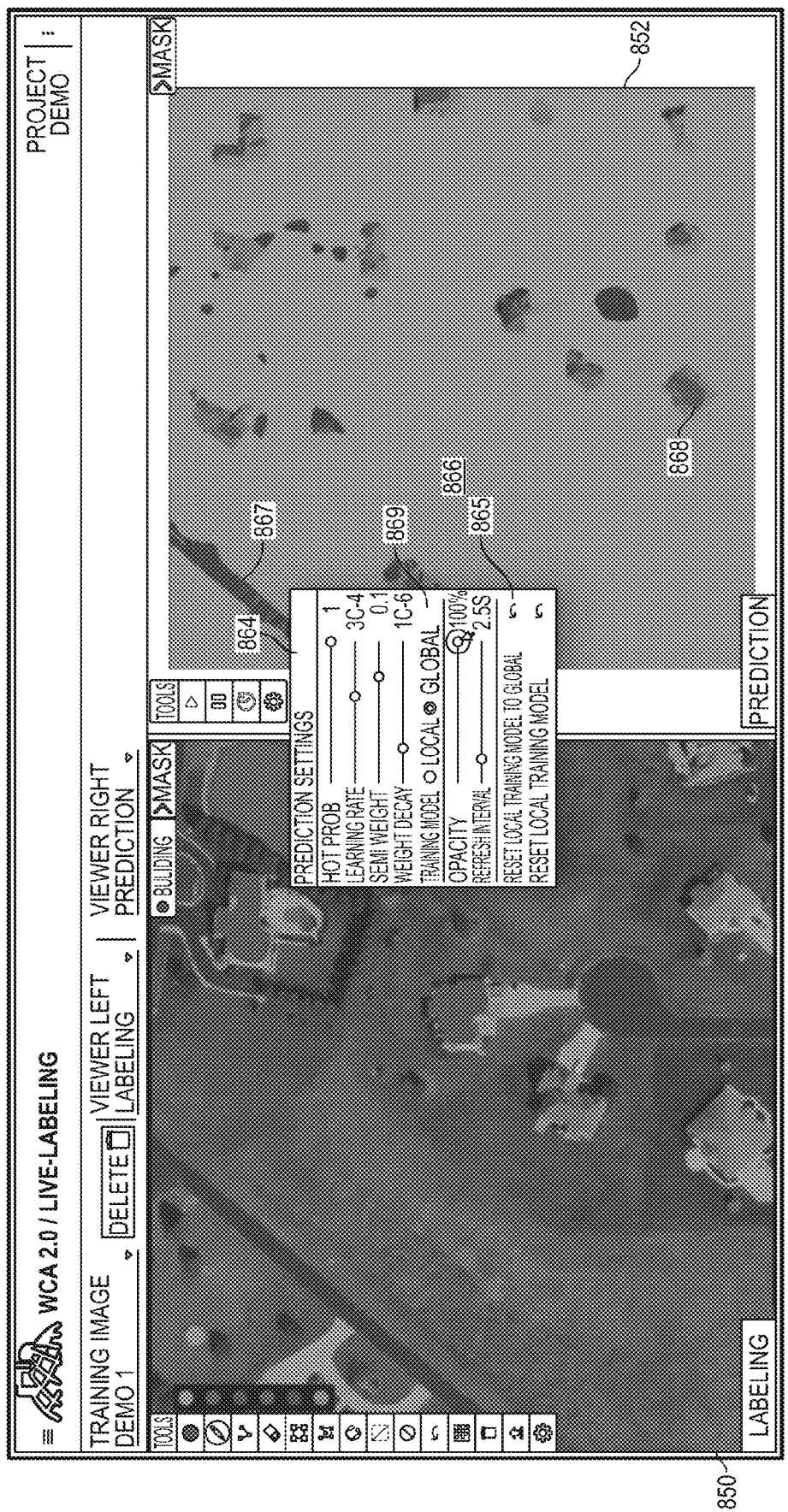
FIG. 34 illustrates the live labeling interface and the selection of prediction settings.

FIG. 34 illustrates the live labeling interface and the selection of prediction settings. The operator has selected the settings icon within tools 858 which is open window 864. As shown, there are a variety of settings already explained, and a setting 869 by which the operator may choose either the local model or, in this case, the global model to be used to generate the prediction mask which appears in the prediction window on the right-hand side. The operator has begun to annotate by labeling houses 862 and 863 in red, but has not yet labeled other features such as roads 860 and 861.

Selecting the setting "Reset Local Training Model to Global" 865 means that a new local model will be spawned from the global model, that all further annotations will be sent to the new local model (as well as to the global model), and that this new local model will be used to process annotations and output a prediction mask, which processing will not be affected by any subsequent inputs to the global model from other operators. Selecting the setting "Reset Local Training Model" means that a new, blank local model will be used that is not a spawn of the global model, but has been retrained on generic datasets.

The operator has also selected the play button within tools 858 which means that the prediction masks generated by the global model (or local model as the case may be) will be updated and displayed in the prediction window after each training iteration (i.e., every 0.1 to 5 seconds); the labeling mask and its sparse labels are continuously sent to back-end system 140 for iteration even if the play button is not pressed. And as shown, prediction window 852 already shows a prediction mask in which regions 866 appears in pink (background), region 867 appears in blue (a road), and structure 868 appears in red (a building). Even though so few annotations are shown in the labeling window, the prediction window already shows large regions of pink because the global model has been iterating and generating prediction masks using inputted labeled images from other images in the same project from different operators. Again, it is noted that the global model pertains to a particular project which is a batch of images of a particular region, and may be accepting labeled images from that region from any of a number of operators who are annotating images in that batch.

Figure 35:
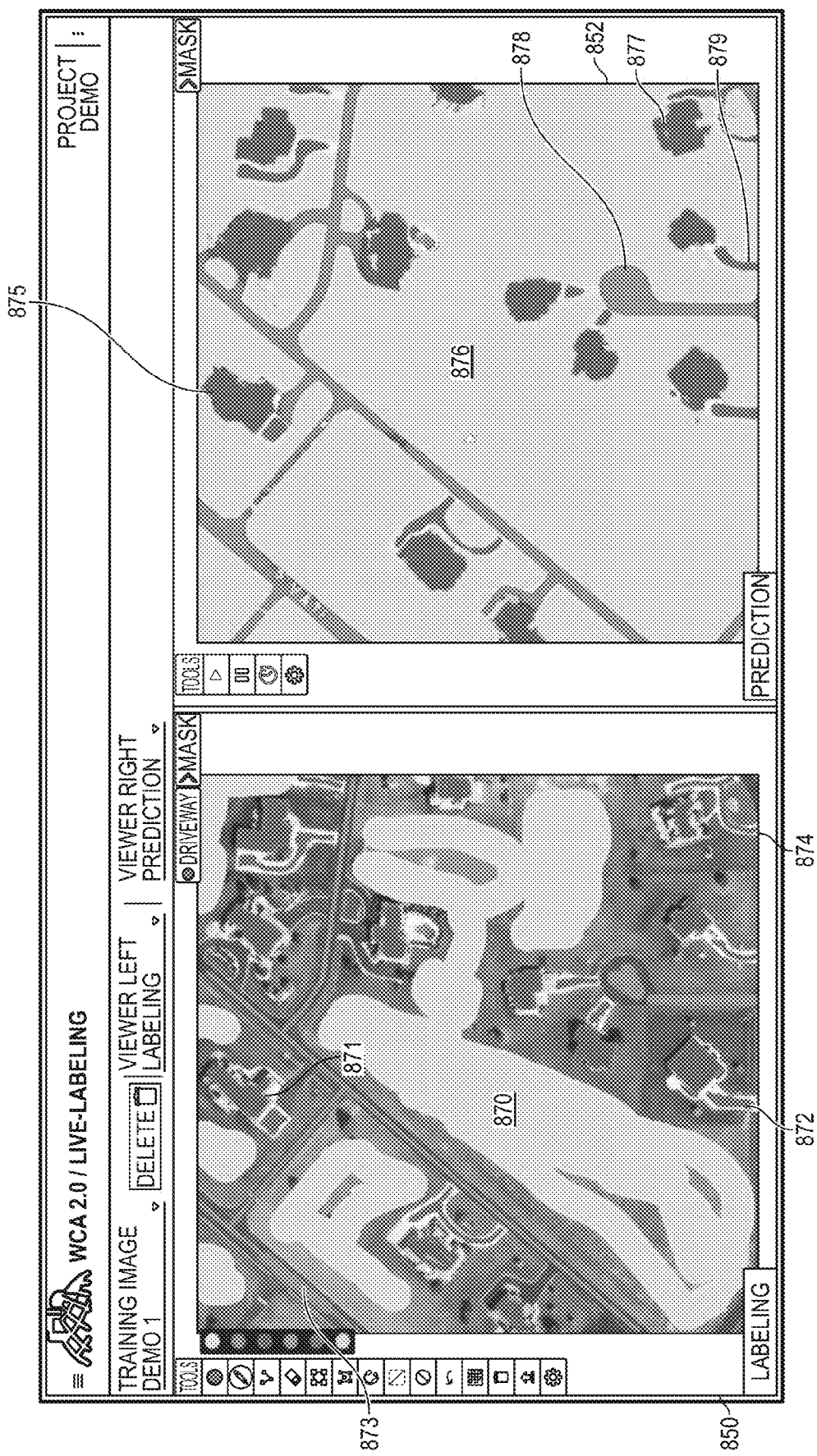
FIG. 35 illustrates the live labeling interface and changes in the prediction window.

FIG. 35 illustrates the live labeling interface and changes in the prediction window. Labeling window 850 shows further annotations by the operator such as many background regions 870 being labeled in pink, houses 872 being labeled in red, Rhodes 873 being labeled in blue, and driveways 874 being labeled in brown. Because the play button within tools 858 is "on," the prediction mask within prediction window 852 will continuously update every few seconds as the backend processes input from labeling window 850 and outputs updated prediction masks. As shown, the prediction mask now shows all background regions 876 being labeled in pink, all houses 877 being labeled in red, all roads 878 being labeled in blue, and all driveways 879 being labeled in brown. Advantageously, the sparse labels in the labeling window need not cover the entire region of a particular feature (such as roads, buildings, background, driveways, etc.), yet the prediction mask will show these features being completely covered in the appropriate color for that class. By way of example, even though building 871 in the labeling mask is not completely covered by red color, in the prediction mask building 875 is completely covered with the red label.

Figure 36:
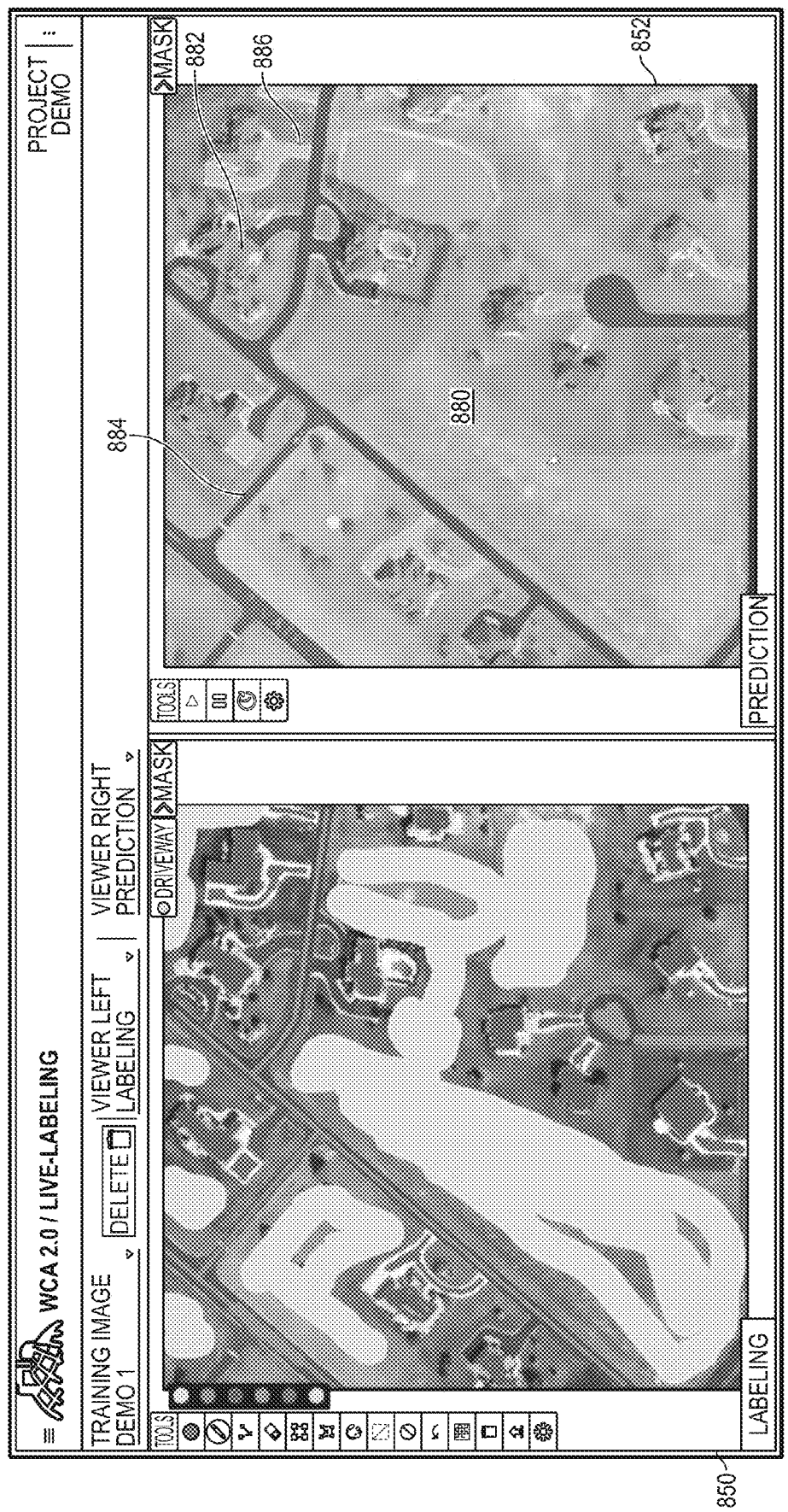
FIG. 36 illustrates the live labeling interface and how the opacity of the prediction mask may be changed.

FIG. 36 illustrates the live labeling interface and how the opacity of the prediction mask may be changed. Using a slider from window 864 the operator may adjust the opacity of the prediction mask in the prediction window 852, resulting in features from the aerial image being visible in the prediction mask even while colored labels are also visible in the prediction mask at the same time. Shown is an image 880 in the prediction mask in which building 882 is visible as a house and can also be seen as being labeled in red, in which road 884 is visible, and in which driveway 886 is visible and identifiable as a driveway and can also be seen as being labeled in brown.

Figure 37:
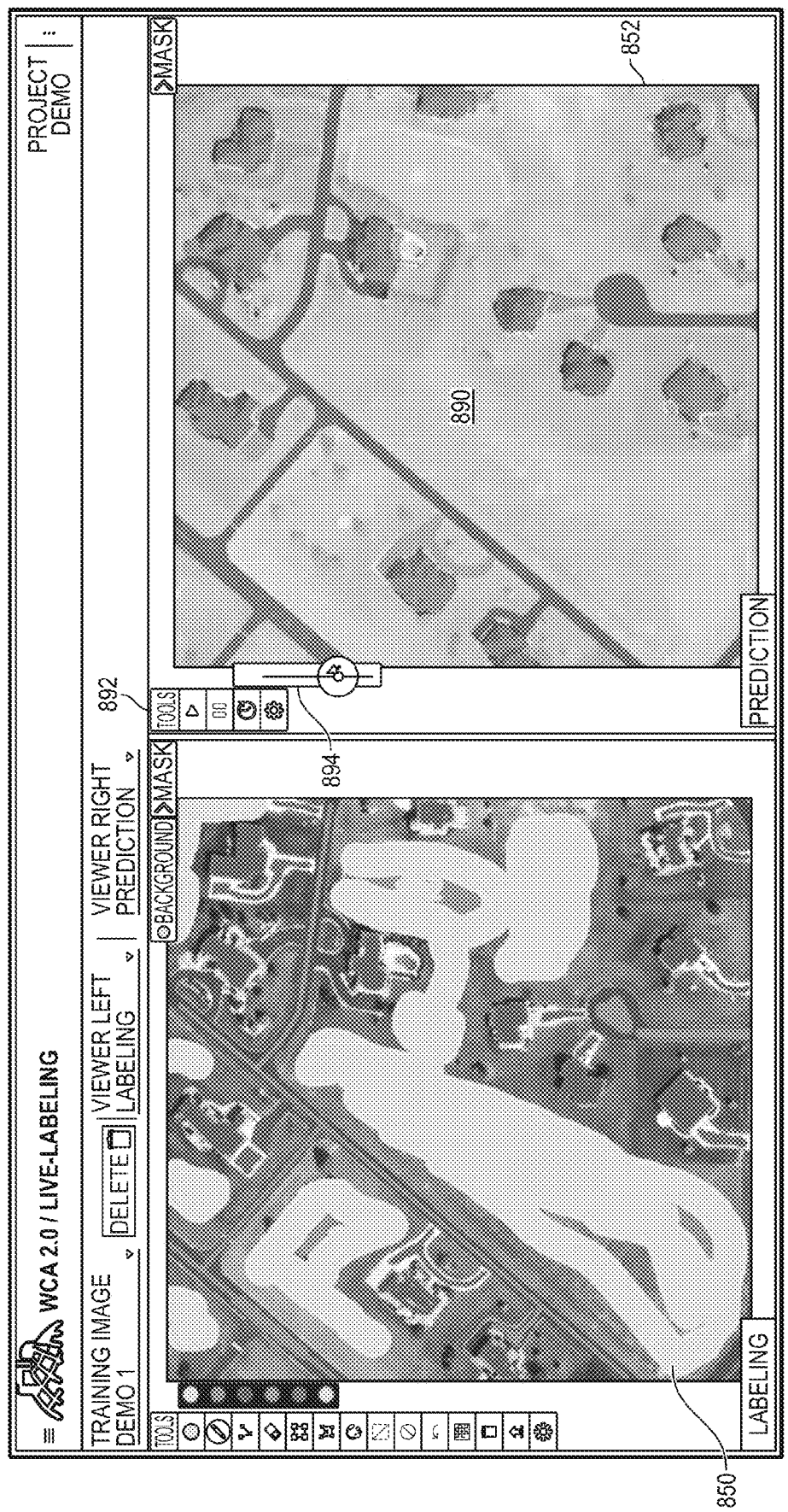
FIG. 37 illustrates the live labeling interface in which a progression in the prediction window is visible.

FIG. 37 illustrates the live labeling interface in which a progression in the prediction window is visible. Shown is the labeling window 850 which is the same as the labeling window shown in FIGS. 35 and 36. Shown also is a progression tool 892 that brings up slider tool 894 when pressed. The slider tool gives the user the option of observing the development of the prediction mask either slowly or quickly. In other words, the slider allows the user to watch the progression of the previous prediction steps (up to the current prediction mask) in quick succession or more slowly. Any number of the last prediction steps are reviewed, ranging from a few up to hundreds. In one particular embodiment, the progression shows about the last thirty prediction steps. Moving the slider all the way up allows the operator to see all of the last prediction steps very quickly while moving the slider all the way down allows the operator to see the last prediction steps much more slowly. Advantageously, this progression gives the operator an indication of potentially problematic areas within the image that may need more detailed labels. A prediction step is the same as a training iteration and represents each time that the prediction window is updated with a new prediction mask from the back-end system.

Image 890 within prediction window 852 shows part of that progression it is similar to image 880 in FIG. 36. In addition, the opacity has been adjusted in image 890 presenting an opacity that is slightly more opaque than image 880 but a lot less opaque than image 876.

Flow Diagrams

Figure 38:
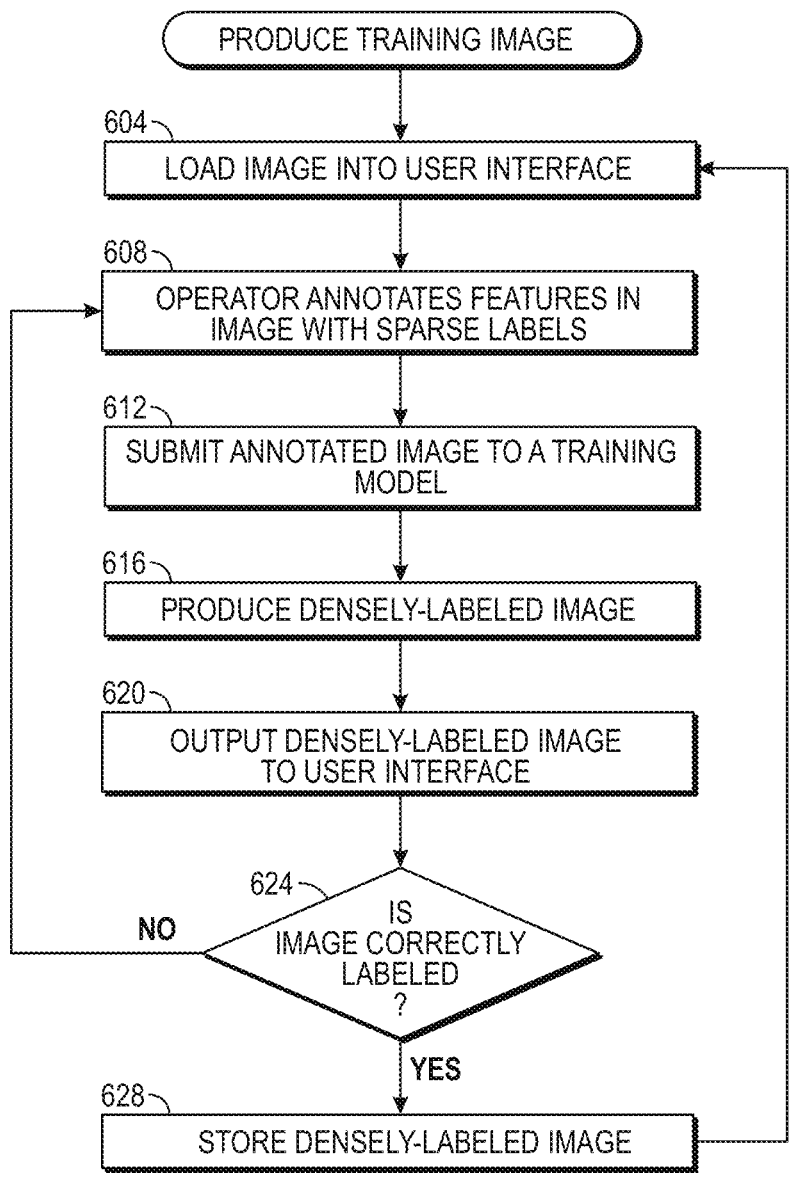
FIG. 38 is a flow diagram describing one embodiment by which a training image is produced using the interactive labeling system.

FIG. 38 is a flow diagram describing one embodiment by which a training image is produced using the interactive labeling system 200. It should be recognized that this process (steps 608-624) happens continuously in the front-end and back-end systems within seconds or fractions of a second. The human annotator is in the loop through the visualization of the prediction process in the prediction window on the right-hand side of the interface and via his or her annotations made in real time in the labeling window of the left-hand side of the user interface.

In a first step 604 the operator loads an image from a batch of images into a user interface of a live labeling software tool as has been shown and described above with respect to FIGS. 5-7. As shown in FIG. 7, the image will initially appear in both the labeling window 350 and in the prediction window 352. The image may be any type of two-dimensional or three-dimensional image as has been described above.

Next, in step 608, the operator annotates features in the image in the labeling window 350 with sparse labels using any of the tools shown in FIG. 8, for example. Thus, the operator may annotate specific geographic regions and features such as water, asphalt, earth, vegetation, buildings, vehicles, houses, etc., using any of the tools shown in FIG. 8. Preferably, the operator uses the color palette to annotate a specific class of features with a particular color, e.g., bodies of water are always annotated with the blue color. As shown in FIGS. 9-16 the operator needs only to annotate a small portion of a particular feature, and needs not annotate every feature from a particular class in the image.

Alternatively, instead of using a color palette, the operator may use a brush tool that, instead of painting a feature with a particular color, paints that feature with a particular shade of gray, ranging from white to black. Or, the brush tool paints each particular feature with a different type of crosshatching, such as crosshatching that may be vertical, horizontal, angled at 45°, etc. Or, the brush tool paints each particular feature with a different type of stippling such as small dots, large dots, small circles, large circles, dashed lines interspersed with dots, etc. Any technique may be used to annotate a feature as long as the operator is able to visually differentiate the annotation from others, and is able to visually differentiate the densely-labeled features when shown in the prediction window. Other examples of painting are shown in the figures above.

Once annotated, a particular annotation upon a feature is saved to the image file or saved in a corresponding file. In one embodiment, all annotations for an area are saved as a layer image (in PNG) for the specific aerial image in the back end without loss. A pixel in the layer image corresponds with the pixel in the corresponding aerial image. If there are later changes on the same area a new or updated PNG is created for the same aerial image. The output image also uses a layer image to store labels.

Once the operator has added one more annotations, in step 612 the annotated image from labeling window 350 is submitted to the back-end system 140 where it is input into the global or local training model, such as a model being executed by one of the processes 60 or by model 292, for example. As mentioned, a local model is a spawn from the global model of the current project, and the global model that is assigned to a project is preferably pretrained on detection tasks in aerial images. A model may be a convolutional neural network, typically pre-trained on some task-related dataset, or at a minimum pre-trained on a general purpose task like ImageNet classification. Preferably, input of the labels of the annotated image occurs automatically and continuously while the operator is annotating the image. In one preferred embodiment, each time the operator makes an annotation in the labeling window this new annotation is sent to the back-end system. In another embodiment, annotations are collected by the front-end system and delivered to the back-end system periodically, such as every 5 seconds, 10 seconds, etc. The entire up-to-date labeling mask may be sent continuously or periodically with the new annotations, or, a labeling mask may be sent that only contains the newly added annotations.

Next, at step 616 the prediction process uses the model to operate upon the input annotated image with the sparse labels that have been added in order to produce a densely-labeled image in which greater portions of each feature that has been sparsely labeled are now labeled completely, and in which features that had not been annotated are now labeled completely based upon a sparse label for the same class. In short, the prediction process is the actual application of the training process (global or local) based upon the human-input sparse labels of the input image. The visualization in the prediction window will represent the outcome to the human annotator.

Next, in step 620 the back-end system produces the densely-labeled image and outputs this image back to the front-end system 180 where it is displayed in the user interface in the prediction window 352, such as is shown in FIG. 16. Thus, the output prediction mask is the visualization of the prediction process.

Next, in step 624 the user interface of the live labeling tool displays the densely-labeled image to the operator in the prediction window 352. At this point, the operator is able to quickly scan the densely-labeled image to understand if any features remain to be labeled or if any features were incorrectly labeled. Alternatively, the operator need not scan the densely-labeled image, but may continue annotating the input image, especially if he or she has not completed annotations or is just beginning to annotate. When an operator reaches a stopping point, needs a break, or wishes to view progress of the output image, he or she may then scan the output image. Thus, unless the operator explicitly indicates that the image has been completely labeled, control returns to step 608 and the operator continues to annotate and the system continues to receive the input annotations and produce an output image for viewing. Thus, as the operator annotates, the back-end system continuously produces an updated densely-labeled image in window 352.

Advantageously, as shown in FIG. 16 in prediction window 352, most all features have been automatically labeled by the back-end system which the operator is able to quickly and easily verify because of the use of color for particular classes of features. Large amounts of time are saved because, for example, the operator does not need to individually label (or completely label) every single house in labeling window 350. If, after visually scanning the image in window 352, the operator concludes that the image has been correctly labeled and no further annotations are needed, then he or she selects a button on the user interface in order to indicate that annotation and labeling of this image is complete and that the densely-labeled image should then be stored as an appropriate training image. Accordingly, the front-end system then operates to store the densely-labeled image in database 170 as an image to be used in future training as one of many in a labeled training data set for a specific project. Database 170 may be any suitable persistent storage database of computer 130, 131 or other remote computer such as any remote server computer.

Once the image has been stored in step 628 then control returns to step 604 and the operator may load a new image (from defined region 300, for example) in order to continue the annotation on a different image.

On the other hand, if the operator concludes that further annotations are needed upon the image in the labeling window in order to further complete the image shown in the prediction window, then control returns to step 608 and the operator continues to annotate the image in the labeling window 350 using any of the tools available. Or, if the operator concludes that certain features are labeled incorrectly in the prediction window 352 then the operator may use tools such as the "eraser" or "circle" tools in order to remove, delete or change an annotation in the labeling window 350.

Thus, the above discloses various embodiments. In one, the operator continuously adds annotations to an image and the system continuously receives the input, updates the densely-labeled image and sends them to the interface for viewing, the output images being updated every few seconds, thus a continuous loop of steps 608-624. In this embodiment, the "play" button on the output image is "on." Or, the play button is off, and even though steps 608-624 are occurring in a loop, in step 620 the user interface will not display the produced output images in real time. Only when the operator presses "play" will the stored output images be updated in real time upon the user interface.

Figure 39:
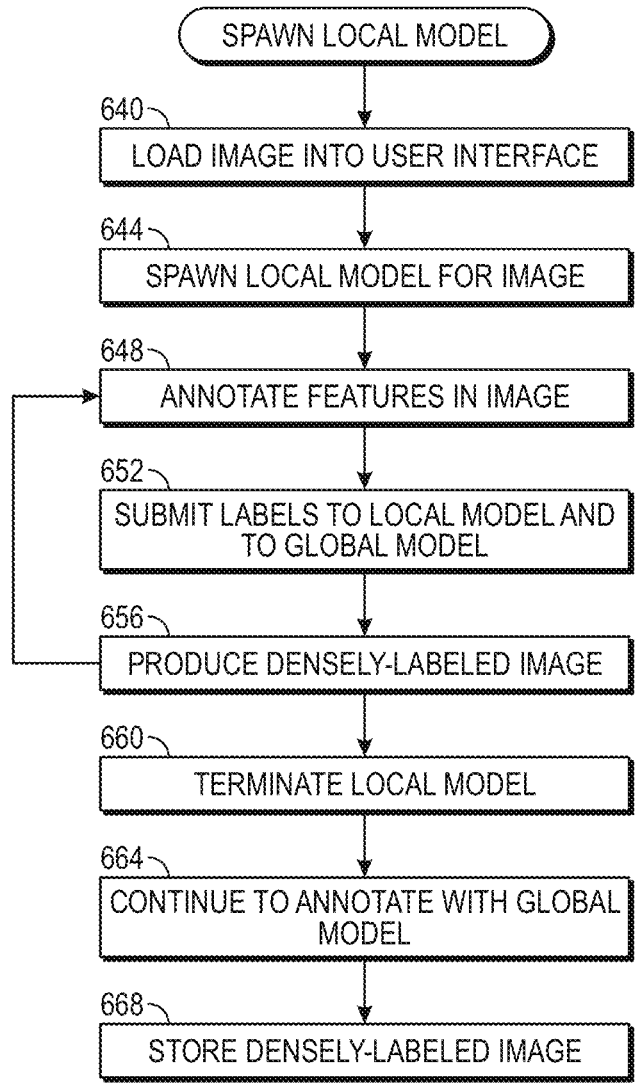
FIG. 39 is a flow diagram describing one embodiment by which a local model is spawned using the interactive labeling system.

FIG. 39 is a flow diagram describing one embodiment by which a local model is spawned using the interactive labeling system 200. As with FIG. 38, the human annotator is in the loop through the visualization of the prediction process in the prediction window on the right-hand side of the interface and via his or her annotations made in real time in the labeling window of the left-hand side of the user interface. The technique of spawning a local model as described below may be used by an operator when first beginning to annotate an image who does not wish other annotations from other operators on other images (which are being input to, are changing, and are modifying output from the global model for that batch of images) to affect his or her annotations on the current image. Once the operator has finished using the local model to accurately label features of the current image he or she may then revert to using the global model.

In a first step 640, the operator loads an image into the user interface as has been described in step 604. As mentioned above, there may be any number of operators each annotating a different image from a batch of images, all such annotations being processed by the global model in real time as these operators work. The next step 644 the operator decides to spawn a local model for the particular image her or she is working on in order to, for example, improve the labeling for particular class of features (e.g., the image has numerous water bodies and the operator wishes to focus on labeling and training the model to recognize water bodies more accurately). The operator may select button 865 from the prediction settings window in order to spawn a new local model from the global model. Once selected, the back-end system then proceeds to spawn a new local model as follows. For one, the CPU or GPU of the backend computer allocates more resources for the local model; it also spawns a new process to handle execution of the local model and allocates new user space in memory and storage for use by that local model. Next, the computer makes a copy of the global model and places that in the execution space of the new local model process so that the local model will begin execution with a copy of the global model.

As the operator then begins to annotate the image in step 648 these annotations (sparse labels 244) will be input in step 652 to the local model and will also be input to the global model in parallel, and the global model continues continuous execution as before. But, the front-end system in step 656 will only receive prediction masks 274 via the local model to be displayed in its prediction window. The local model will then continue execution and will focus its learning upon only the annotations added by that operator and will not be affected by other annotations being added by other operators from different front-end systems or any changes to the global model. Further details on operation of steps 648-656 may be found in FIG. 38 and in the images of the user interface described above.

At a later point in time the operator decides that the local model has been trained adequately on the feature or features he or she had selected and decides to cease using the local model and revert to the global model in step 660. Because the previous annotations had also been fed continuously into the global model there is no need at this point to feed these annotations into the global model, but, in an alternative embodiment, these annotations may be fed in bulk to the global model at this time rather than feeding the annotations continuously to the global model as they are being made in real time. The operator may terminate using the local model simply by selecting another image for processing (such as shown in FIG. 6), by closing his or her browser, the user interface or the live labeling tool itself, or by selecting an option within prediction settings window 864 (not shown) that directs the back-end system to terminate the local training process representing the local model and freeing up its computer resources. At that point, the operator may continue to annotate that image (or a different image if so selected) using the global model.

In step 668 the densely-labeled image that has been annotated by the operator may be stored or downloaded for use in training. As discussed above, the labeling mask produced on the front-end system is continuously updated and stored in persistent storage on the front-end system while the operator makes annotations on the image. In addition, as the labeling mask is also sent continuously to the backend system, this backend system is also able to store the latest updated labeling mask along with its corresponding image in persistent storage. Accordingly, the labeling mask along with its corresponding image (referred to as the labeled training image) may be downloaded from the front-end system or preferably from the backend system directly or using an API, and thus may be used to accurately and efficiently train a computer model for recognizing unlabeled images in a particular region of interest.

Computer System Embodiment

Figure 40:
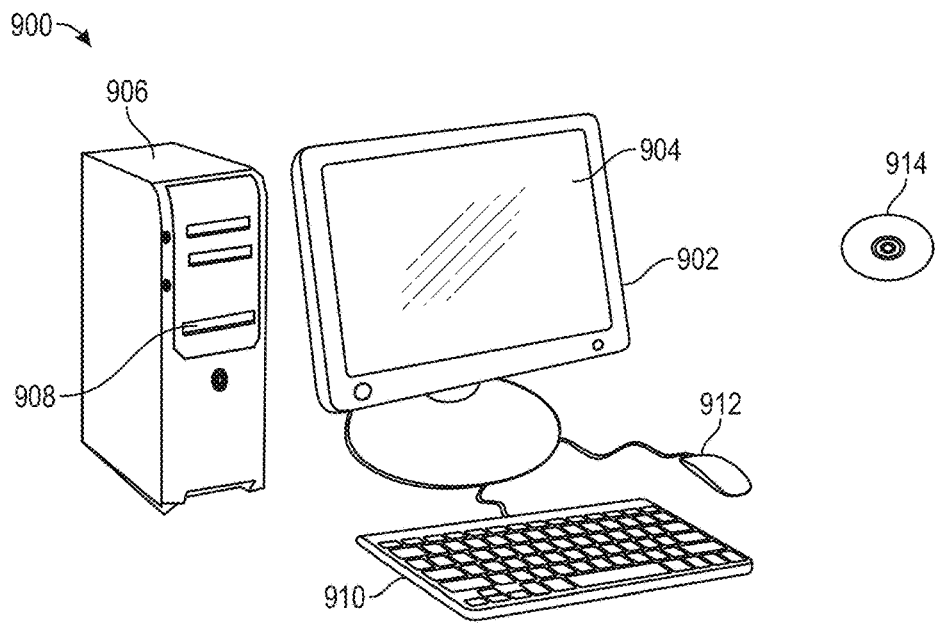
FIG. 40 shows one possible physical form of the computer system.
Figure 41:
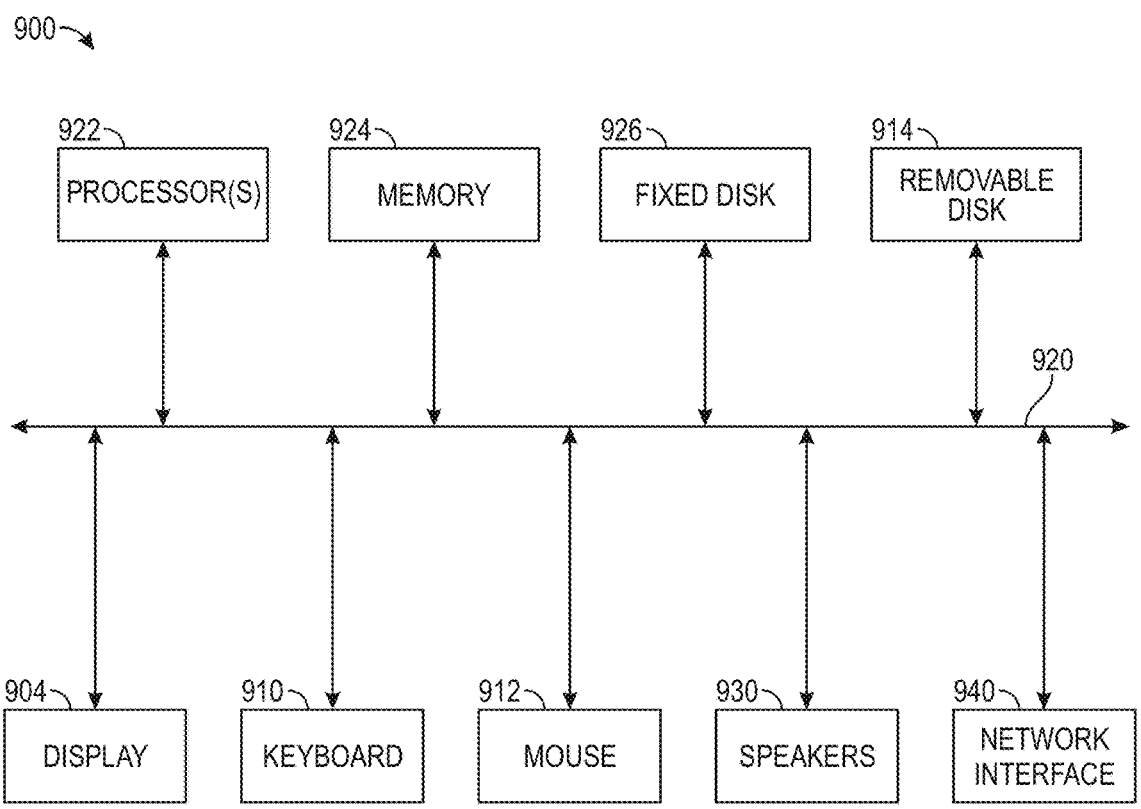
FIG. 41 is an example of a block diagram for the computer system.

FIGS. 40 and 41 illustrate a computer system 900 suitable for implementing various of the computers of the present invention. FIG. 40 shows one possible physical form of a computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 41 is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of generating a training image for use in machine learning training, said method comprising:
    a) loading an image into a software tool of a computer system;
    b) displaying said image in a first window and in a second window on a display screen of said computer system;
    c) receiving input from a user via said first window that labels a feature of a first class of features in said image with a first label, said first label being displayed over said feature in said first window;
    d) outputting a labeling mask including said first label into a computer model that automatically assigns said first label to unlabeled features of said image that are of said first class of features;
    e) receiving, at said computer system, from said computer model a prediction mask that includes said first label in locations corresponding to locations of said unlabeled features in said image; and
    f) displaying said prediction mask over said image in said second window such that said unlabeled features are now labeled with said first label.

2. A method as in claim 1 wherein said first label is a color that corresponds to said first class of features.

3. A method as in claim 1 further comprising:
    performing said steps of d), e) and f) within less than about five seconds after said step of receiving input.

4. A method as in claim 1 further comprising:
    performing said steps of c), d), e) and f) continuously.

5. A method as in claim 1 further comprising:
    performing said steps of c), d), e) and f) by labeling a feature of a second class of features in said image with a second label, such that said unlabeled features of said second class are now labeled with said second label in said image in said second window.

6. A method as in claim 1 further comprising:
    outputting or storing said prediction mask with said first label along with said image as a training image.

7. A method as recited in claim 1 wherein said first label of said labeling mask is stored in a location of said labeling mask such that said first label corresponds to said feature of said image.

8. A method as recited in claim 1 wherein said displaying of said prediction mask over said image in said second window is live feedback in response to said outputting a labeling mask including said first label into a computer model.

9. In a back-end server computer, a method of generating a training image for use in machine learning training, said method comprising:
    a) receiving from a software tool of a computer system a labeling mask including a first label that corresponds to a feature of a first class of features in a corresponding image;
    b) combining said labeling mask with said corresponding image;
    c) inputting said combined labeling mask and image into a computer model that automatically assigns said first label to unlabeled features of said image that are of said first class of features;
    d) outputting, to said software tool of said computer system, a prediction mask that includes said first label in locations corresponding to locations of said unlabeled features in said image; and
    e) displaying said prediction mask over said image in a second window of said software tool of said computer system such that said unlabeled features are now labeled with said first label.

10. A method as recited in claim 9 wherein said first label is stored in a location of said labeling mask such that said first label corresponds to said feature.

11. A method as recited in claim 9 wherein said received labeling mask having been labeled with said first label in a first window of said software tool different from said second window.

12. A method as in claim 9 further comprising:
    performing said steps of b), c) and d) within less than about five seconds after said step of receiving.

13. A method as in claim 9 further comprising:
performing said steps of a), b), c) and d) continuously.

14. A method as in claim 9 further comprising:
performing said steps of a), b), c) and d) by labeling a feature of a second class of features in said image with a second label, such that said unlabeled features of said second class are now labeled with said second label in said image in said second window.

15. A method as in claim 9 further comprising:
outputting or storing said prediction mask along with said image as a training image.

16. In a back-end server computer, a method of spawning a local model for use in machine learning training, said method comprising:
  a) receiving from a software tool of a computer system a command to spawn a local model from a global model of said backend server computer;
  b) copying said global model to a new process of said backend server computer and executing said new process as said local model;
  c) receiving, from only said computer system, a labeling mask including a first label that corresponds to a feature of a first class of features in a corresponding image;
  d) combining said labeling mask with said corresponding image and inputting said combined labeling mask and image into said local model; and
  e) outputting, from said local model, to said software tool of said computer system, a prediction mask that includes said first label in locations corresponding to locations of unlabeled features in said image.

17. A method as recited in claim 16 further comprising:
displaying said prediction mask over said image in a window of said software tool such that said unlabeled features are now labeled with said first label.

18. A method as recited in claim 16 further comprising:
said local model automatically assigning said first label to said unlabeled features of said image that are of said first class of features.

19. A method as recited in claim 16 wherein said local model executes independently of said global model and does not receive labeling masks from computers other than from said computer system.

20. A method as recited in claim 16 further comprising:
inputting said combined labeling mask and image into said global model as well as inputting said combined labeling mask and image into said local model; and
processing said combined labeling mask and image in said global model.

21. A method as recited in claim 16 wherein said first label is stored in a location of said labeling mask such that said first label corresponds to said feature.

22. A method as recited in claim 16 wherein said received labeling mask having been labeled with said first label in a first window of said software tool different from a second window of said software tool in which said prediction mask is displayed.

23. A method as in claim 16 further comprising:
outputting or storing said prediction mask along with said image as a training image.

24. A method of spawning a local model for use in machine learning training, said method comprising:
  a) loading an image into a software tool of a computer system;
  b) displaying said image in a first window and in a second window on a display screen of said computer system;
  c) receiving a command from a user via said software tool to spawn a local model from a global model in a backend server computer;
  d) outputting, from said computer system, a labeling mask into said local model of said backend server computer that automatically assigns a first label to unlabeled features of said image that are of a first class of features;
  e) receiving, at said computer system, from said local model of said backend server computer a prediction mask that includes said first label in locations corresponding to locations of unlabeled features in said image; and
  f) displaying said prediction mask over said image in said second window such that said unlabeled features are now labeled with said first label.

25. A method as recited in claim 24 further comprising:
said local model automatically assigning said first label to said unlabeled features of said image that are of said first class of features.

26. A method as recited in claim 24 wherein said local model executes independently of said global model and does not receive labeling masks from computers other than from said computer system.

27. A method as recited in claim 24 further comprising:
outputting said labeling mask into said global model as well as outputting said labeling mask into said local model; and
processing said labeling mask in said global model.

28. A method as recited in claim 24 further comprising:
receiving input from said user via said software tool that labels a feature of a first class of features in said image with a first label, said first label being displayed over said feature in said first window, wherein said labeling mask includes said first label and wherein said first label is stored in a location of said labeling mask such that said first label corresponds to said feature.

29. A method as recited in claim 24 wherein said labeling mask having been labeled with said first label in said first window of said software tool which is different from said second window.

30. A method as in claim 24 comprising:
outputting or storing said prediction mask along with said image as a training image.

* * * * *